United States Patent
Lee et al.

(10) Patent No.: US 10,310,676 B2
(45) Date of Patent: Jun. 4, 2019

(54) IMAGE PROJECTION APPARATUS AND OPERATION METHOD THEREOF

(71) Applicant: LG ELECTRONICS INC., Seoul (KR)

(72) Inventors: Sangho Lee, Seoul (KR);
Kyoungjoung Kim, Seoul (KR);
Kyungho Lee, Seoul (KR); Hyunhee You, Seoul (KR); Hyunsik Yoon, Seoul (KR); Yangsik Kim, Seoul (KR);
Jihwan Lim, Seoul (KR); Jeonghoon Park, Seoul (KR); Taesoon Kim, Seoul (KR); Sangkyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/549,131

(22) PCT Filed: Aug. 10, 2015

(86) PCT No.: PCT/KR2015/008366
§ 371 (c)(1),
(2) Date: Aug. 4, 2017

(87) PCT Pub. No.: WO2016/125966
PCT Pub. Date: Aug. 11, 2016

(65) Prior Publication Data
US 2018/0024696 A1    Jan. 25, 2018

(30) Foreign Application Priority Data

Feb. 4, 2015   (KR) ........................ 10-2015-0017547
May 21, 2015   (KR) ........................ 10-2015-0071272

(51) Int. Cl.
*G06F 3/01*    (2006.01)
*G06F 3/03*    (2006.01)
(Continued)

(52) U.S. Cl.
CPC ............ *G06F 3/0425* (2013.01); *G06F 3/017* (2013.01); *G06F 3/0304* (2013.01);
(Continued)

(58) Field of Classification Search
CPC .. G06F 3/0482; G06F 3/04842; G06F 3/0304; G06F 3/0425; G06F 3/0488;
(Continued)

(56) References Cited

U.S. PATENT DOCUMENTS

2012/0139689 A1    6/2012  Nakade
2014/0198030 A1*   7/2014  Takazawa ............... G06F 3/017
                                                          345/156
(Continued)

FOREIGN PATENT DOCUMENTS

JP    2009-031334 A    2/2009
JP    2014-163954 A    9/2014
(Continued)

OTHER PUBLICATIONS

PCT International Application No. PCT/KR2015/008366 International Search Report dated Dec. 8, 2015, 4 pages.

*Primary Examiner* — Muhammad N Edun
(74) *Attorney, Agent, or Firm* — Lee, Hong, Degerman, Kang & Waimey

(57) ABSTRACT

An image projection apparatus according to an embodiment of the present invention senses the distance to an image projection area to which an image is projected, and determines an image projection state including a state of at least one of the image projection area and a space between the image projection apparatus and the image projection area, on the basis of the sensed distance. The image projection apparatus projects an image onto the image projection area on the basis of the determined image projection state.

12 Claims, 34 Drawing Sheets

(51) Int. Cl.
  *H04N 5/74* (2006.01)
  *H04N 9/31* (2006.01)
  *G06F 3/042* (2006.01)
  *G06F 3/0482* (2013.01)
  *G06F 3/0484* (2013.01)
  *G06F 3/0488* (2013.01)

(52) U.S. Cl.
  CPC .......... *G06F 3/0482* (2013.01); *G06F 3/0488* (2013.01); *G06F 3/04842* (2013.01); *H04N 5/74* (2013.01); *H04N 9/31* (2013.01); *H04N 9/3179* (2013.01); *G06F 2203/04101* (2013.01)

(58) Field of Classification Search
  CPC .......... G06F 3/017; G06F 2203/04101; H04N 9/3179; H04N 5/74; H04N 9/31
  See application file for complete search history.

(56) References Cited

U.S. PATENT DOCUMENTS

| | | | | |
|---|---|---|---|---|
| 2014/0375677 | A1* | 12/2014 | Shin | G06F 3/041 345/629 |
| 2015/0304615 | A1* | 10/2015 | Hiroi | G03B 21/10 348/744 |

FOREIGN PATENT DOCUMENTS

| KR | 10-2012-0029246 A | 3/2012 |
|---|---|---|
| KR | 10-2013-0029740 A | 3/2013 |

* cited by examiner

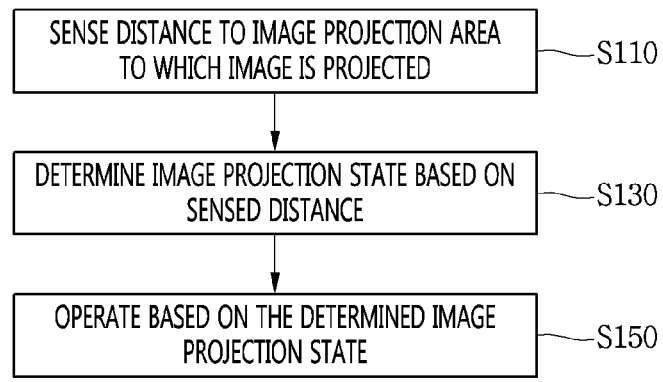
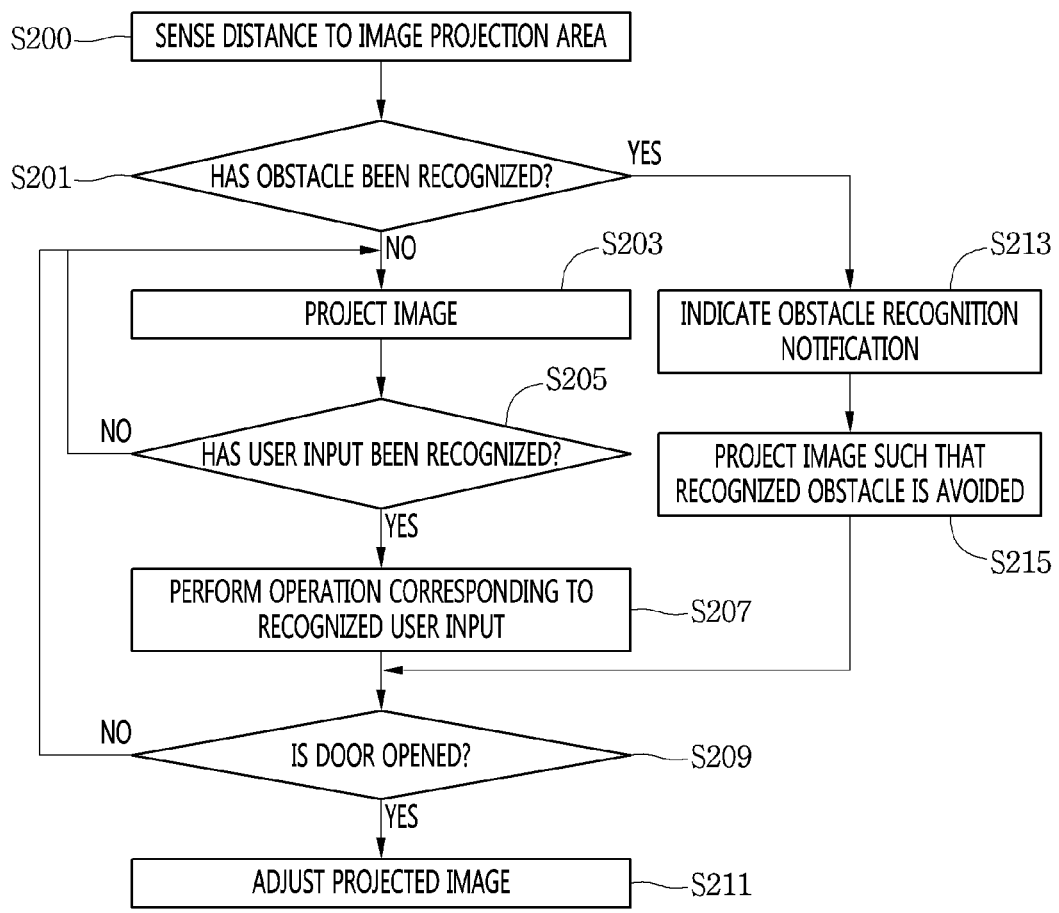

IMAGE PROJECTION APPARATUS AND OPERATION METHOD THEREOF

CROSS-REFERENCE TO RELATED APPLICATIONS

This application is the National Stage filing under 35 U.S.C. 371 of International Application No. PCT/KR2015/008366, filed on Aug. 10, 2015, and also claims the benefit of earlier filing date and right of priority to Korean Patent Application Nos. 10-2015-0071272, filed on May 21, 2015 and 10-2015-0017547, filed on Feb. 4, 2015, the contents of which are all hereby incorporated by reference herein in their entirety.

TECHNICAL FIELD

The present invention relates to an image projection apparatus and an operating method thereof, and more particularly to an image projection apparatus and an operating method thereof, capable of determining a state of an image projection area, to which an image is projected, and of performing an operation corresponding to the determined state of the image projection area.

BACKGROUND ART

Recently, a manner of displaying an image may include not only a manner of displaying an image inside a device similarly to a display device, but also a manner of projecting an image to a predetermined area similarly to a projector.

According to the displaying of the image through the display device, there are a limitation in the size of a screen on which the image is displayed and a difficulty in displaying the image on an area other than the screen of the display device.

Meanwhile, an image projection apparatus, such as a projector, may provide a screen larger than that of the display device and may display the image on various positions depending on directions of projecting the image.

Meanwhile, recently, an input manner of allowing a user to directly touch a screen displayed on the display device through various touch manners has been extensively used. According to the user input manner based on the touch manner, the user may directly perform a touch motion to the displayed screen, so that the user may intuitively recognize the input manner or the user manner.

However, the image projection apparatus may not receive the user input through the touch manner due to the feature that there is absent a specific display in the image projection apparatus.

In addition, in the case of the image projection apparatus, if there is present an obstacle between a point, to which the image is projected, and the image projection apparatus, the projected image may be hidden. In addition, if the user is directly exposed to the projected image, the eyesight of the user may be damaged.

The above disadvantages of the image projection apparatus may need to be solved.

DISCLOSURE

Technical Problem

An object of the present invention is to provide an image projection apparatus capable of projecting an image to various positions, thereby increasing the utilization of a space and improving an outer appearance.

Another object of the present invention is to determine the state of an image projection area, to which an image is projected, and to project the image corresponding to the determined image projection area, thereby providing a pleasant viewing environment for a user.

Another object of the present invention is to recognize a user input to the projected screen and thus to perform a control operation for the projected image.

Technical Solution

According to an embodiment of the present invention, an operating method of an image projection apparatus includes sensing a distance to an image projection area to which an image is projected; determining, based on the sensed distance, an image projection state including a state of at least one of the image projection area and a space between the image projection apparatus and the image projection area; and projecting, based on the determined image projection state, the image on the image projection area.

According to an embodiment of the present invention, an image projection apparatus includes an image projection unit that projects an image; a sensing unit that senses a distance to an image projection area to which an image is projected; and a control unit that determines, based on the sensed distance, an image projection state including a state of at least one of the image projection area and a space between the image projection apparatus and the image projection area, and performs a control operation such that an image is projected to the image projection area based on the determined image projection state.

According to another embodiment of the present invention, an operating method of an image projection apparatus includes projecting an image including at least one menu to an image projection area; sensing a first distance for a user input corresponding to the menu; and performing, based on the sensed first distance, an operation corresponding to the menu.

According to another embodiment of the present invention, an image projection apparatus includes an image projection unit that projects an image including at least one menu to an image projection area; a distance sensor that senses a first distance for a user input corresponding to the menu; and a control unit that performs, based on the sensed first distance, an operation corresponding to the menu.

Advantageous Effects

According to various embodiments of the present invention, the image projection apparatus according to the present invention may project the image to various positions, thereby increasing the utilization of a space and improving an outer appearance.

In addition, according to the present invention, the state of an image projection area, to which an image is projected, may be determined, and the image corresponding to the determined image projection area may be projected, thereby providing a pleasant viewing environment for the user.

In addition, according to the present invention, the user input to the projected image may be recognized so that the operation and the function desired by the user may be easily performed.

DESCRIPTION OF DRAWINGS

FIG. 8 is a flowchart illustrating an operating method of the image projection apparatus according to an embodiment of the present invention.

FIG. 9 is a flowchart illustrating the detailed operation of the image projection apparatus according to an embodiment of the present invention.

BEST MODE

Mode for Invention

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Hereinafter, an operating method of an image projection apparatus and the image projection apparatus using the same according to an embodiment of the present invention will be described in detail.

The image projection apparatus according to an embodiment of the present invention, which is, for example, an intelligent image projection apparatus in which a computer aid function is added to a broadcast reception function, may perform sufficiently the broadcast reception function while additionally performing the Internet function. Accordingly, the image projection apparatus may have an interface, such as voice command recognition, gesture motion recognition, a handwriting input device, a touch screen or a space remote control, which is convenient for use. In addition, the image projection apparatus allows the user to access the Internet and a computer to perform a function, such as an e-mail, web-browsing, banking, or playing a game, as a wired or wireless Internet function is supported. A general standard operating system (OS) may be used for the various functions.

Therefore, the image projection apparatus set forth in the present disclosure may perform various user-friendly functions since various applications may be, for example, freely added or deleted on a general OS kernel. The image projection apparatus may be an image projector in more detail. If necessary, the image projection apparatus is applicable to a smart phone.

Figure 1:
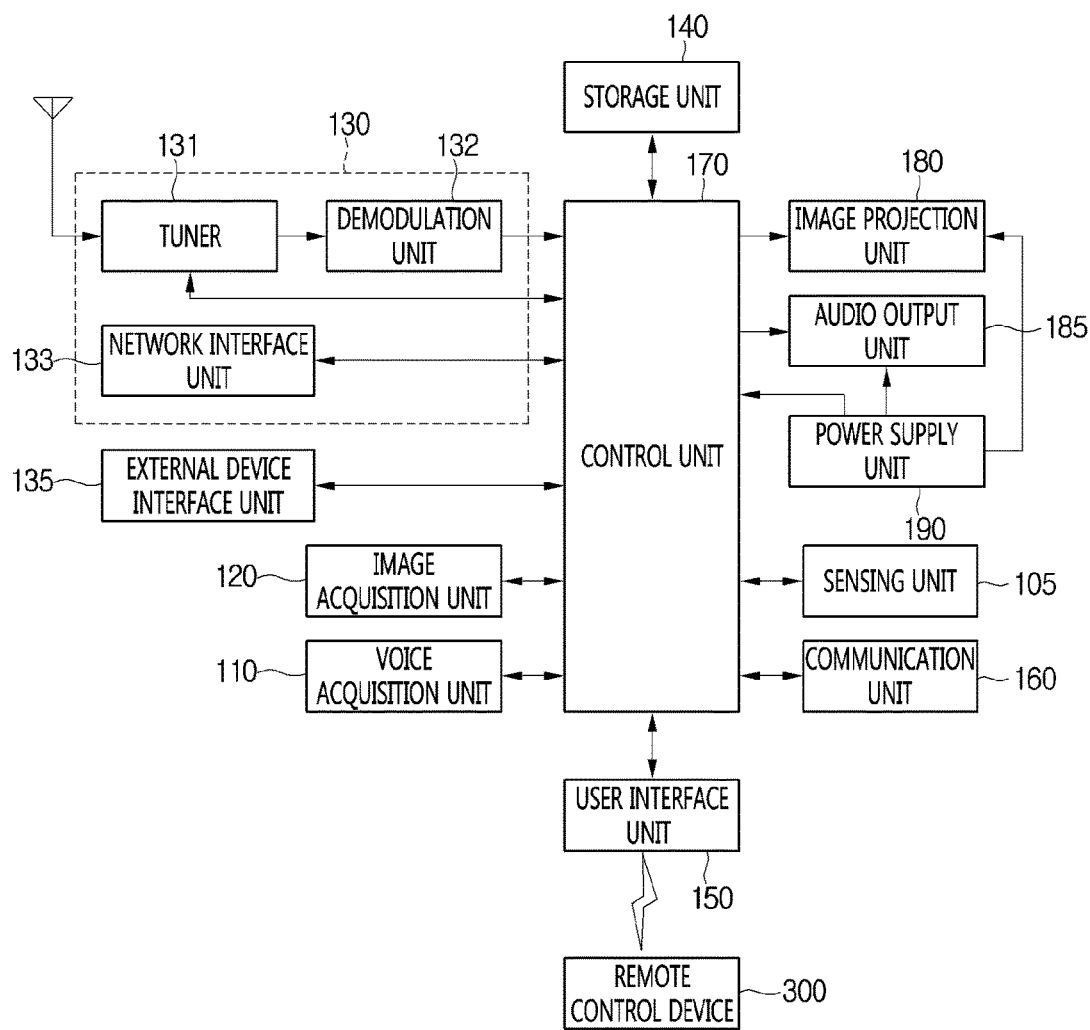
FIG. 1 is a block diagram illustrating an image projection apparatus according to an embodiment of the present invention.

FIG. 1 is a block diagram illustrating the image projection apparatus according to an embodiment of the present invention.

Referring to FIG. 1, the image projection apparatus 100 may include a sensing unit 105, a voice acquisition unit 110, an image acquisition unit 120, a broadcast reception unit 130, an external device interface unit 135, a storage unit 140, a user input interface unit 150, a communication unit 160, a control unit 170, an image projection unit 180, an audio output unit 185, and a power supply unit 190.

The sensing unit 105 may include at least one sensor which senses at least one of include internal information of the image projection apparatus, surrounding information of the image projection apparatus, and user in.

For example, the sensing unit 105 may at least one of a distance sensor 106, a proximity sensor, an illuminance sensor, a touch sensor, an acceleration sensor, a magnetic sensor, a G-sensor, a gyroscope sensor, a motion sensor 107, an RGB sensor, an infrared sensor (IR sensor), a finger scan sensor, an ultrasonic sensor, an optical sensor, a battery gauge, and an environmental sensor (e.g., a barometer, a hygrometer, a thermometer, a radiation sensor, a thermal sensor, a gas sensor, etc.), a chemical sensor (e.g., an electronic nose, a health care sensor, or a biometric sensor). Meanwhile, the image projection apparatus 100 disclosed in the present specification may utilize the combination of information sensed by at least two sensors of the above sensors.

The distance sensor 106 may include at least one sensor which is able to sense a distance.

According to an embodiment, the distance sensor 106 may include an IR sensor to sense a distance to various objects or a point to which an image is projected. For example, the IR sensor included in the distance sensor 106 may output an infrared light and may recognize an infrared light, which is formed as the output infrared light is reflected from an object, by an image sensor included in the distance sensor 106.

The distance sensor 106 may include various sensors in addition to the IR sensor. For example, the distance sensor 106 may include an ultrasonic sensor and may output light having remaining wavelengths other than the wavelength of the infrared light. The detailed operation of the distance sensor 106 will be described below.

Meanwhile, the sensing unit 105 may recognize the state of an area, to which the image is projected, by sensors additionally provided in the sensing unit 105.

For example, the sensing unit 105 may acquire information on the movement of the area, to which the image is projected, from a magnet type sensor or a switch type sensor provided in the area to which the image is projected.

The voice acquisition unit 110 may acquire voice.

The voice acquisition unit 110 may include at least one microphone. Accordingly, the voice acquisition unit 110 may acquire voice through the microphone.

The voice acquisition unit 110 may deliver the acquired voice to the control unit 170.

The image acquisition unit 120 may acquire an image.

The image acquisition unit 120 may include at least one camera. Accordingly, the image acquisition unit 120 may acquire the image through the included camera. Accordingly, the image acquisition unit 120 may capture an image of a user. In addition, the image acquisition unit 120 may acquire images related to bio-information, such as the iris or the vein, of the user.

The image acquisition unit 120 may deliver the acquired image to the control unit 170.

Meanwhile, the voice acquisition unit 110 and the image acquisition unit 120 may be included in the user input interface unit 150.

Meanwhile, the broadcast reception unit 130 may include a tuner 131, a demodulation unit 132, and a network interface unit 133.

The external device interface unit 135 may receive internal applications of an adjacent external device or the list of the internal applications and may deliver the internal applications or the list of the internal applications to the control unit 170 or the storage unit 140.

The external device interface unit 135 may include a terminal for connection with the external device and thus may be connected with a connector of the external device.

The external device interface unit 135 may supply power, which is received from a power supply unit 190, to the connected external device.

In addition, the external device interface unit 135 may deliver an operating signal, which is transmitted by the external device, to the control unit 170.

Since the external device interface unit 135 may include a sensor which senses the connection with the external device, the external device interface unit 135 may recognize the connection with the external device.

The network interface unit 133 may provide an interface to connect the image projection apparatus 100 with a wired/wireless network including the Internet. The network interface unit 133 may transmit or receive data from or to another user or another electronic device through the accessed network or another network linked with the accessed network.

In addition, part of content stored in the image projection apparatus 100 may be transmitted to a user or an electronic device selected among other users or other electronic devices which are previously registered in the image projection apparatus.

The network interface unit 133 may access a predetermined web-page through the accessed network or another network linked with the accessed network. In other words, the network interface unit 133 may access the predetermined web-page through the network to transmit or receive data to or from a relevant server.

In addition, the network interface unit 133 may receive content or data provided by a content provider or a network operator. In other words, the network interface unit 133 may receive content, such as a movie, an advertisement, a game, a video on Demand (VOD) or a broadcasting signal, and information related to the content from the content provider or a network provider through a network.

In addition, the network interface unit 133 may receive update information and update file of firmware provided by the network operator and may transmit data to the Internet, the content provider, or the network operator.

The network interface unit 133 may select and receive a desired one of applications open to the public through the network.

The storage unit 140 may store a program for signal processor and controlling inside the control unit 170 and may store a video, voice, or a data signal subject signal processing.

In addition, the storage unit 140 may perform a function of temporarily storing the video, the voice, or the data signal input from the external device interface unit 135 or the network interface unit 133 and may store information on a predetermined image through a function of memorizing a channel.

The storage unit 140 may store an application or an application list input from the external device interface unit 135 or the network interface unit 133.

In addition, the storage unit 140 may store bio-information of a user. In this case, the bio-information of the user may refer to intrinsic information, such as information on the fingerprint, the iris, the vein, the face, or the voice of the user, related to the body of the user.

The image projection apparatus 100 may reproduce a content file (e.g., a moving picture file, a still image file, a music file, a document file, an application file, or the like) stored in the storage unit 140.

The storage unit 140 may store personalization service information of the user. In this case, the personalization service information on the user may include information on at least one of a function frequently used by a user, a channel and content frequently viewed by the user, and a setting value set by the user. In addition, the personalization service information on the user may include information on a personalized function or a personalized menu for each of a plurality of users.

The user input interface unit 150 may deliver a signal, which is input by the user, to the control unit 170 or may deliver a signal from the control unit 170 to the user. For example, the user input interface unit 150 receives and processes a control signal for power on/off signal, channel selection, or screen setting from a remote controller 200 according to various communication schemes, such as Bluetooth, Ultra Wideband (UWB), a ZigBee scheme, a Radio Frequency (RF) communication scheme, or an IR communication scheme. Alternatively, the user input interface unit 150 may perform processing to transmit a control signal from the control unit 170 to the remote controller 200.

In addition, the user input interface unit 150 may transmit, to the control unit 170, a control signal input from a power key, a channel key, a volume key, or a local key (not shown) such as a setting value.

The communication unit 160 may include one or more modules that enable wired communication or wireless communication between the image projection apparatus 100 and the network or between the image projection apparatus 100 and a peripheral device.

For example, the communication unit 160 may include an Internet module for Internet connection and may allow the image projection apparatus 100 to connect to the Internet through the Internet module via the wired or wireless communication.

Alternatively, the communication unit 160 may include a short-range communication module that enables wireless communication between the image projection apparatus 100 and another device. According to an embodiment, the short-range communication module included in the communication unit 160 may use Bluetooth, Radio Frequency Identification (RFID), infrared Data Association (IrDA), Ultra Wideband (UWB), ZigBee, Wireless LAN (WLAN) (Wi-Fi), Near Field Communication (NFC), or the like.

An image signal that is image-processed by the control unit 170 may be input to an image projection unit 180, and an image corresponding to the image signal may be displayed thereon. In addition, the image signal that is image-processed by the control unit 170 may be input to an external output device through the external device interface unit 135.

The voice signal that is processed by the control unit 170 may be output to the audio output unit 185. In addition, the voice signal that is processed by the control unit 170 may be input to an external device through the external device interface unit 135.

In addition, the control unit 170 may transmit the processed voice signal to an audio output device 300, which is described later, and may control the audio output device 300 to output audio.

In addition, the control unit 170 may control an overall operation of the video display device 100.

The control unit 170 may receive a sensing signal based on the connection with the external device from the external device interface unit 135 and may control the power supply unit 190 to deliver driving power to the external device connected through the external device interface unit 135.

In addition, the control unit 170 may recognize voice acquired through the voice acquisition unit 110 and may perform a control operation corresponding to the recognized voice.

In addition, the control unit 170 may compare a plurality of voice signals for the voice of the user with each other, may recognize voice a voice signal representing the most excellent quality, and may perform a control operation corresponding to the recognized voice.

The control unit 170 may determine a position of a user by comparing a plurality of voices acquired from the voice acquisition unit 110 including a plurality of microphones. Specifically, the control unit 170 may determine a position of the user who utters a voice by comparing voices acquired by the microphones.

On the other hand, the control unit 170 may control the image projection apparatus 100 by a user command input through the user input interface unit 150 or an internal program and may connect to the network to download an application or an application list desired by the user into the image projection apparatus 100.

The control unit 170 may output channel information selected by the user through the image projection unit 180 or the audio output unit 185 together with the processed image or voice signal.

In addition, the control unit 170 may output the image signal or the voice signal, which is input from the external device, for example, a camera or a camcorder, through the external device interface unit 135, to the image projection apparatus 180 or the audio output unit 185 according to an external device image reproduction command received through the user input interface unit 150.

On the other hand, the control unit 170 may control the image projection unit 180 to display an image. For example, the control unit 170 may control the image projection unit 180 to display a broadcast image input through the tuner 131, an external input image input through the external device interface unit 135, an image input through the network interface unit, or an image stored in the storage unit 140. In this case, the image displayed on the image projection unit 180 may be a still image or a moving image, or may be a 2D image or a 3D image.

Additionally, the control unit 170 may perform control to reproduce content stored in the image projection apparatus 100, received broadcast content, or external input content input from the outside. The content may be various types, such as a broadcast image, an external input image, an audio file, a still image, a connected web screen, a document file, and the like.

In addition, the control unit 170 may compare at least one of input bio-information and pattern information of the user with at least one of bio-information and pattern information which are previously stored. Accordingly, the control unit 170 may search for bio-information, which is the same as input bio-information of the user, from at least one of the bio-information and the pattern information which are previously stored.

In addition, the control unit 170 may acquire personalized service information of the user corresponding to at least one of the bio-information and the pattern information, which are input, based on at least one of the bio-information and the pattern information of the user, which are input. For example, the control unit 180 may recognize the user based on a fingerprint image of the received user or the information on the fingerprint. The control unit 180 may acquire personalized service information corresponding to the recognized user.

In addition, the control unit 170 may adjust an image to be projected based on the distance to the image projection area which is a point to which the image is projected.

In addition, the control unit 170 may determine an image projection state including a state of at least one of the image projection area and a space between the image projection apparatus 100 and the image projection area based on a sensing value of the distance sensor 106. In addition, the control unit 170 may detect a user input for the image projection area based on the sensing value by the distance sensor 106, which will be described later.

The image projection unit 180 may project various images.

The image projection unit 180 may include a light source unit 181, a lens unit 182, and a reflection unit 183.

The light source unit 181 emits beam.

The lens unit 182 selectively transmits only a predetermined wavelength of the beam emitted from the light source unit 181. The lens unit 182 may include a plurality of lenses according to designs.

The reflection unit 183 reflects the beam transmitted through the lens unit 182. In addition, the reflection unit 183 is rotatable in up-down and left-right directions and may reflect the transmitted beam in various directions.

The image projection unit 180 may project an image to a projection point as the beam emitted from the light source unit 181 passes through the lens unit 182.

In addition, the image projection unit 180 may project the image to the projection point as the beam emitted from the light emitting unit 181 passes through the lens unit 182, and is reflected from the reflection unit 183.

The details thereof will be made with reference to FIGS. 2 and 3.

Figure 2:
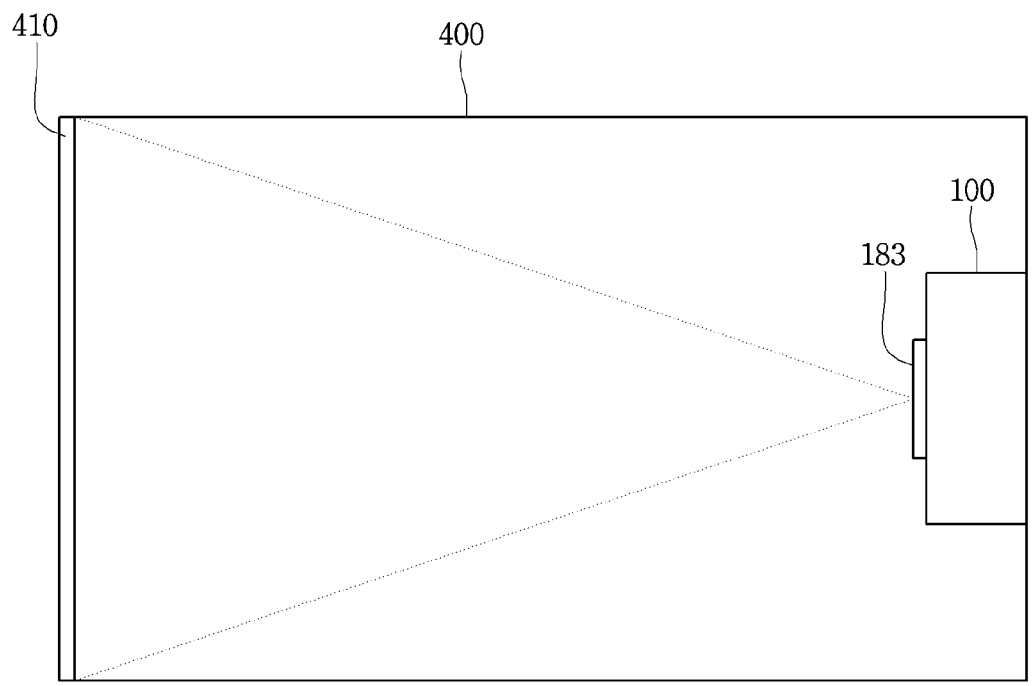
FIG. 2 is a conceptual view illustrating image projection, when viewed in one direction, according to an embodiment of the present invention.

FIG. 2 is a conceptual view image projection, when viewed in one direction, according to an embodiment of the present invention.

Referring to FIG. 2, the image projection apparatus 100 may be provided in the case 400 and may project an image to a door 410 of the case 400. In detail, the image projection apparatus 100 allows the light source unit 181 included in the image projection unit 180 to emit beam and allows the emitted beam to pass through the lens unit 182 and to be reflected from the reflection unit 183 such that the image is projected to the door 410 which is the projection point. Accordingly, an image screen 500, on which the image projected from the image projection unit 180 is displayed, may be displayed on a door 410 of the case 400.

In this case, the door 410 may be a door of the case 400. The door 410 may have a detachable structure or a structure that is open in one direction.

In addition, the door 410 may be a transparent structure or an opaque structure. For example, the door 410 may be formed of a glass material. In addition, a sheet may be attached to the door 410 such that the image is clearly displayed.

Meanwhile, the image projection apparatus 100 may be provided outside the case 400.

In this case, the case 400 may be furniture. For example, the case 400 may be a storage closet or living room furniture. In addition, the case 400 may be a portion or the entire portion of furniture.

Figure 3:
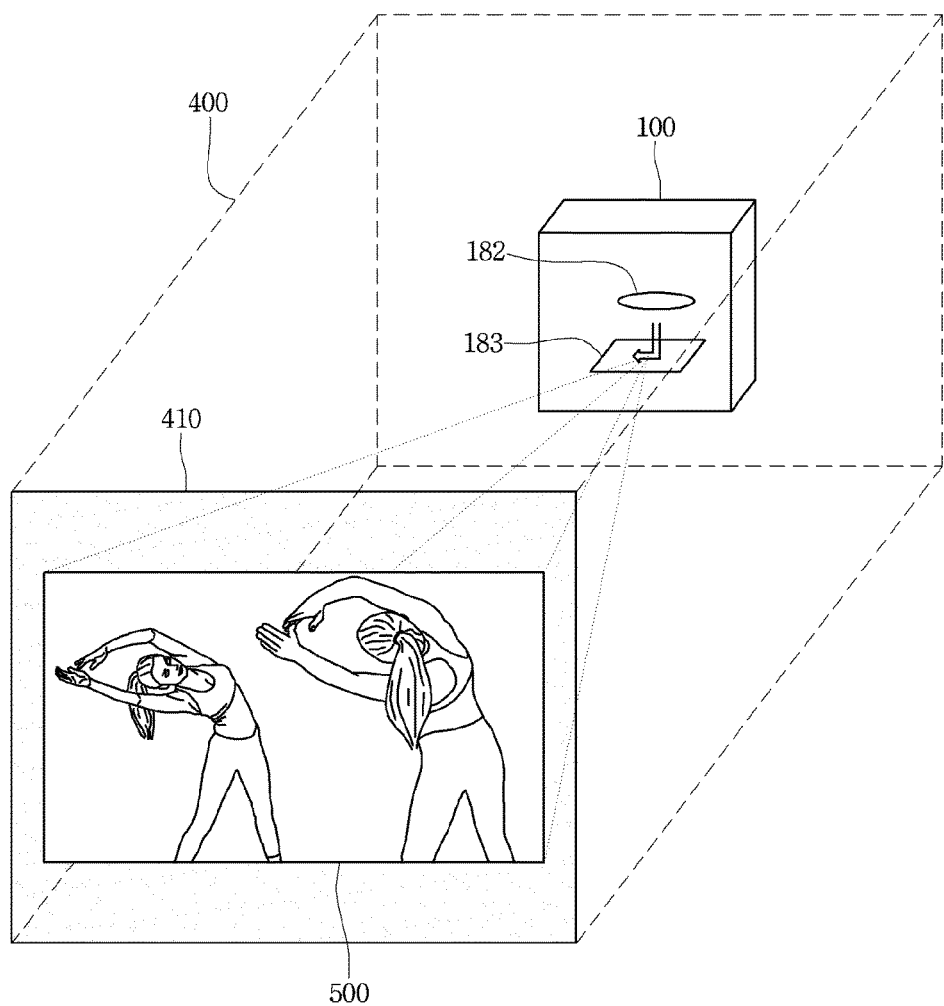
FIG. 3 is a conceptual view illustrating image projection, when viewed in another direction, according to an embodiment of the present invention.

FIG. 3 is a conceptual view image projection, when viewed in another direction, according to an embodiment of the present invention.

In detail, the image projection unit 180 of the image projection apparatus 100 allows the light source unit 181 to emit beam and allows the emitted beam to pass through the lens unit 182 and to be reflected from the reflection unit 183 such that the image is projected to the door 410 which is the projection point. Accordingly, the image screen 500, on which the image projected from the image projection unit 180 is displayed, may be displayed on a door 410 of the case 400.

The detailed embodiment of displaying the image projected from the image projection unit 180 will be described with reference to FIGS. 4 and 5.

Figure 4:
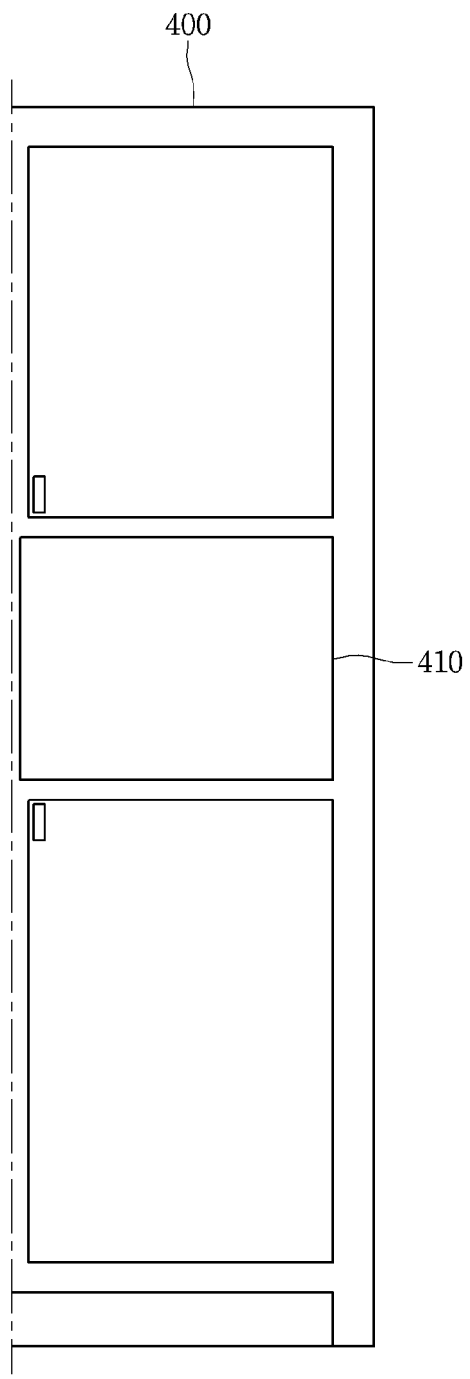
FIG. 4 is a view illustrating a case according to an embodiment of the present invention.

FIG. 4 is a view illustrating a case according to an embodiment of the present invention.

Referring to FIG. 4, the case 400 may be furniture including at least one receiving space or at least one decoration space. Accordingly, the case 400 may include at least one door 410. In addition, the door 410 may be formed of a transparent material or an opaque material. Accordingly, when the image is not projected, the door 410 may have a general door form.

Figure 5:
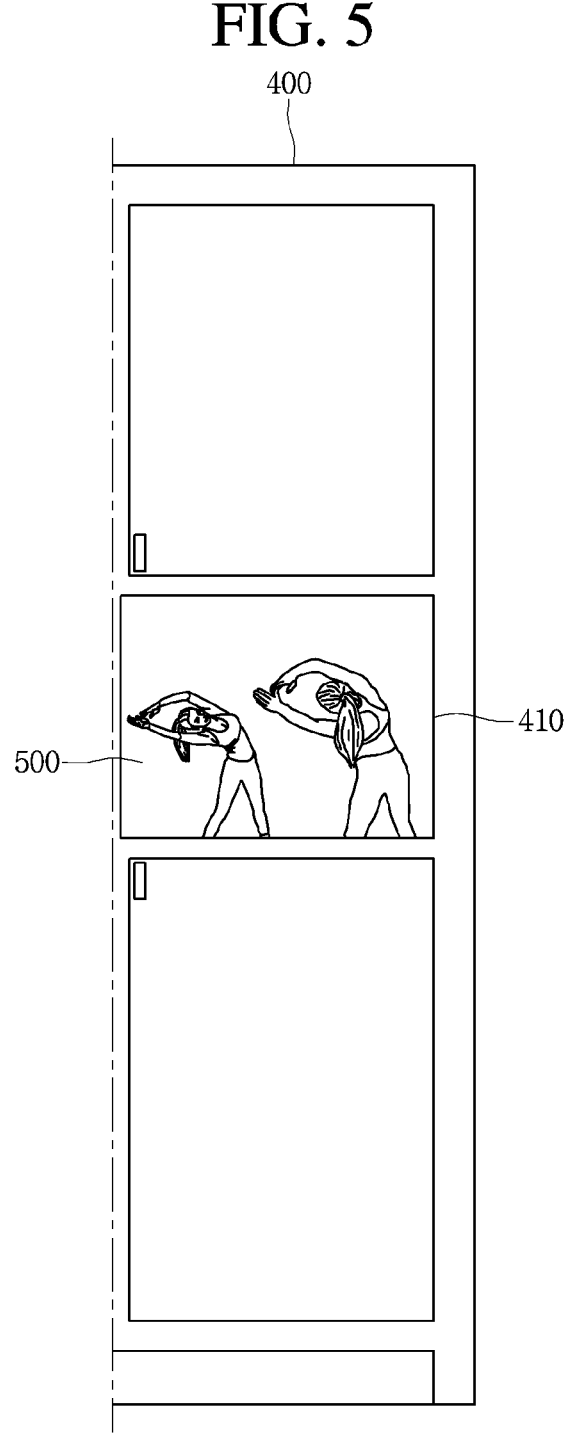
FIG. 5 is a view illustrating a case to which an image is projected according to an embodiment of the present invention.

FIG. 5 is a view illustrating a case to which an image is projected according to an embodiment of the present invention.

Referring to FIG. 5, the image projected by the image projection apparatus 100 may be projected to the door 410 of the case 400. Accordingly, the image screen 500 may be displayed depending on the image projected to the entire portion or the portion of the door 410.

The image projection unit 180 may project the image to a point to the image is to be projected such that the image screen 500 may be displayed.

In addition, the image projection apparatus 100 may project the image to various areas or an object in addition to the door 410. The details thereof will be described below.

Meanwhile, the image projection unit 180 may project the image except the reflection procedure of the reflection unit 183. Therefore, as the beam generated from the light source unit 181 passes through the lens unit 182, the image may be projected to the point to which the image is to be projected.

Since the image projection method of the image projection unit 180 is generally known, the details thereof will be omitted.

The image projection unit 180 may convert an image signal, a data signal, or an OSD signal, which is processed by the control unit 170, or an image signal or a data signal, which is received from the external device interface unit 135, into R, G, and B signals to generate a driving signal.

The image projection apparatus 100 illustrated in FIG. 1 is provided for the illustrative purpose according to an embodiment of the present invention. Some of the illustrated elements may be integrated, added, or omitted depending on the specifications of the image projection apparatus 100 which is actually realized.

In other words, if necessary, at least two elements may be integrated into one component, or one element may be sub-divided into at least two elements. In addition, the function performed in each block is provided for the illustrative purpose according to an embodiment of the present invention, and the detailed operation or the device for the same does not limit the scope of the present invention.

According to another embodiment of the present invention, the image projection apparatus 100 may receive and reproduce an image through the network interface unit 133 or the external device interface unit 135 without including the tuner 131 and the demodulation unit 132, differently from those of FIG. 1.

For example, the image projection apparatus 100 may be implemented by including an image processing device, such as a set-top box, for receiving content based on a broadcast signal or various network services and a content reproduction device for reproducing content input from the image processing device.

In this case, an image display method according to an embodiment of the present invention, which is to be described below, may be performed by any one of the image processing device, such as the set-top box, or the content reproduction device including the image projection unit 180 and the audio output unit 185, as well as the image projection apparatus 100 that has been described with reference to FIG. 1.

Hereinafter, the description of the remote controller according to an embodiment of the present invention will be described with reference to FIGS. 6 to 7.

Figure 6:
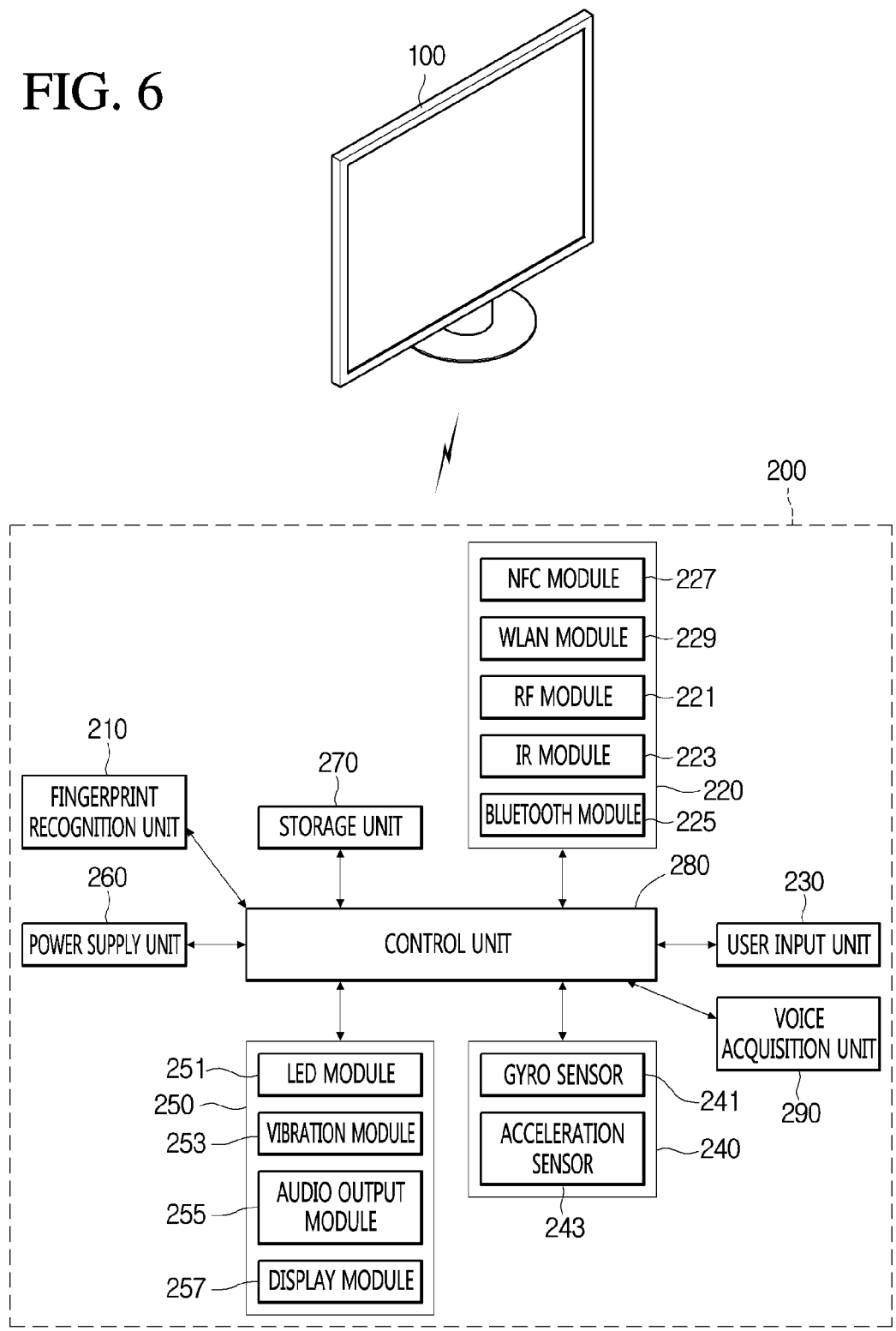
FIG. 6 is a block diagram illustrating a remote controller according to an embodiment of the present invention.
Figure 7:
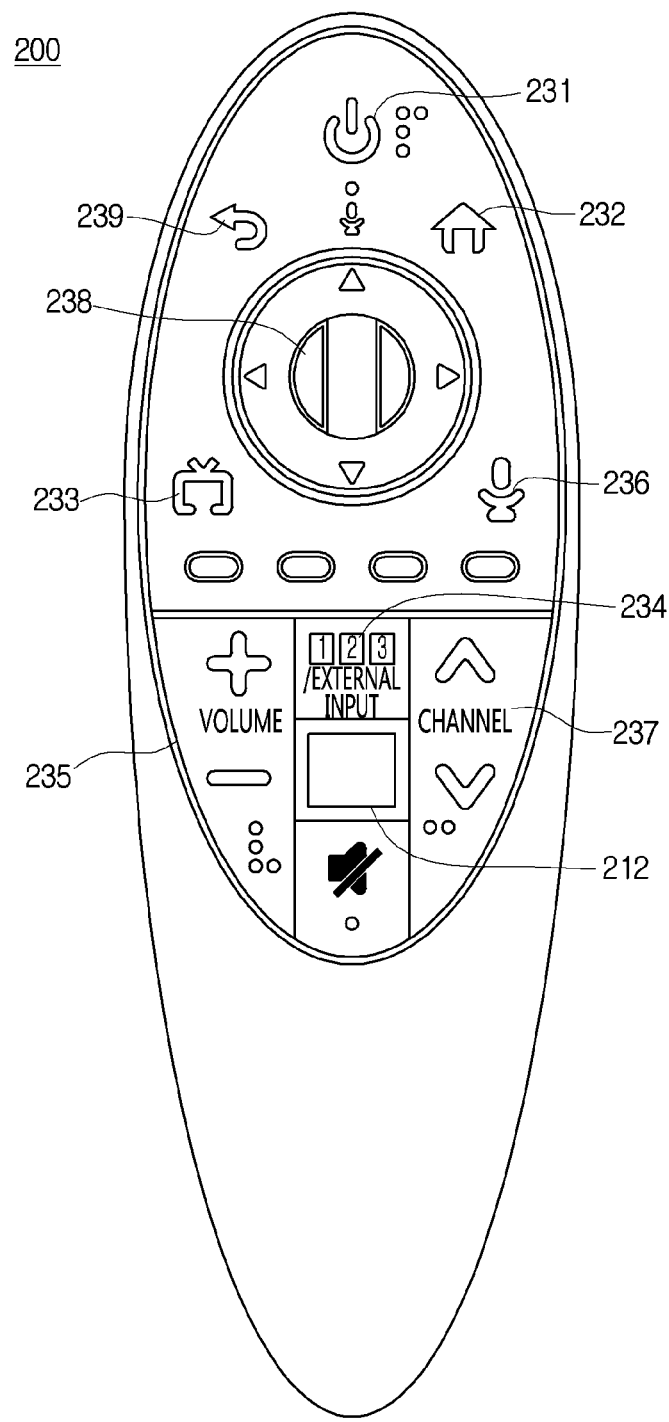
FIG. 7 is a view illustrating an actual configuration of the remote controller according to an embodiment of the present invention.

FIG. 6 is a block diagram illustrating the remote controller according to an embodiment of the present invention and FIG. 7 is a view illustrating an actual configuration of a remote controller according to an embodiment of the present invention.

First, referring to FIG. 6, a remote controller 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290.

The wireless communication unit 220 transmits/receives signals to/from an arbitrary any one of image display devices according to the above-mentioned embodiments of the present invention.

The remote controller 200 may include a radio frequency (RF) module 221 for transmitting/receiving signals to/from the image projection apparatus 100 according to the RF communication standards and an IR module 223 for transmitting/receiving signals to/from the image projection apparatus 100 according to the IR communication standards Additionally, the remote controller 200 may include a Bluetooth module 225 for transmitting/receiving signals to/from the image projection apparatus 100 according to the Bluetooth communication standards. In addition, the remote controller 200 may include an NFC module 227 for transmitting/receiving signals to/from the image projection apparatus 100 according to the Near Field Communication (NFC) communication standards and a WLAN module 229 for transmitting/receiving signals to/from the image projection apparatus 100 according to the Wireless LAN (WLAN) communication standards.

In addition, the remote controller 200 may transmit signals containing information on a movement of the remote controller 200 to the image projection apparatus 100 through the wireless communication unit 220.

Moreover, the remote controller 200 may receive signals transmitted from the image projection apparatus 100 through the wireless communication unit 220 and if necessary, may transmit a command on power on/off, channel change, and volume change to the image projection apparatus 100 through the wireless communication unit 220.

The user input unit 230 may be configured with a keypad button, a touch pad, wheel key or a touch screen. A user may manipulate the user input unit 230 to input a command relating to the image projection apparatus 100 to the remote controller 200. If the user input unit 230 includes a hard key button, a user may input a command relating to the image projection apparatus 100 to the remote controller 200 through the push operation of the hard key button. This will be described with reference to FIG. 7.

Referring to FIG. 7, the remote controller 200 may include a plurality of buttons. The plurality of buttons may include a fingerprint recognition button 212, a power button 231, a home button 232, a LIVE button 233, an external input button 234, a volume button 235, a voice recognition button 236, a channel button 237, a wheel key 238, and a cancellation button 239.

The fingerprint recognition button 212 may be a button for recognizing a user fingerprint. According to an embodiment, the fingerprint recognition button 212 may perform a push operation and may receive a push operation and a fingerprint recognition operation.

The power button 231 may be a button for tuning on or off the power of the image projection apparatus 100 or an external device.

The home button 232 may be a button for displaying a basic menu of the image projection apparatus 100.

The LIVE button 233 may be a button for displaying real-time broadcast program.

The external input button 234 may be a button for displaying an image received from the external device.

The volume button 235 may be a button for adjusting an audio output of the image projection apparatus 100.

The voice recognition button 236 may be a button for recognizing the voice of a user.

The channel button 237 may be a button for receiving a broadcast signal of a specific broadcast channel or a specific broadcast service.

The wheel key 238 may be a wheel-formed key for receiving a user input in at least one direction. For example, the wheel key 238 may be a wheel-formed key for receiving a user input in an up-down direction or up-down and left-right direction. In addition, the wheel key 238 may further include a directional key. In this case, the up-down directional user input to the wheel key 238 may be a user input for rotating the wheel key 238. The left-right user input to the wheel key 238 may be a user input for tilting the wheel key 238. In addition, the wheel key 238 may receive a push input.

The LIVE button 297 may be a button for displaying the real-time broadcast program.

Description will be made again with reference to FIG. 6.

When the user input unit 230 includes a touch screen, a user touches to a soft key of a touch screen such that the user may input a command related to the image projection apparatus 100 by the remote controller 200.

In addition, the user input unit 230 may include various types of input units, such as a scroll key, a jog key, a touch pad, or the like, that is manipulated by the user. The present embodiment is not limited to the scope of the present invention.

The sensor unit 240 may include a gyro sensor 241 or an acceleration sensor 243, and the gyro sensor 241 may sense information on the movement of the remote controller 200.

For example, the gyro sensor 241 may sense the information on the movement of the remote controller 200 in x, y, and z axes. The acceleration sensor 243 may sense the information on the movement speed of the remote controller 200. Meanwhile, the remote controller 200 may further include a distance measurement sensor. Accordingly, the remote controller 200 may sense the distance from the display unit 180.

The output unit 250 may output an image signal or a voice signal corresponding to the manipulation of the user input unit 235 or corresponding to the signal transmitted from the image projection apparatus 100. The user may recognize the manipulation state of the user input unit 235 or the control state of the image projection apparatus 100 through the output unit 250.

For example, the output unit 250 may include a Light Emitting Diode (LED) module 251 turned on when the user input unit 230 has been manipulated or a signal is transmitted to or received from the image projection apparatus 100 through the wireless communication unit 220, a vibration module 253 for generating vibrations, an audio output module 255 for outputting audio, or a display module 257 for outputting a video.

The power supply unit 260 supplies power to the remote controller 200. When the remote controller 200 is kept stationary for a predetermined time, the power supply unit 260 cuts off the supply of the power, thereby preventing waste of the power. When a predetermined key of the remote controller 200 is manipulated, the power supply unit 260 may resume power supply.

The storage unit 270 may store various types of programs or application data required for the control or the operation of the remote controller 200. When the remote controller 200 transmits and receives signals to and from the image projection apparatus 100 wirelessly through the RF module 221, the remote controller 200 and the image projection apparatus 100 perform signal transmission and reception in a predetermined frequency band.

The control unit 280 of the remote controller 200 may store information on the frequency band of wirelessly transmitting and receiving signals to and from the image projection apparatus 100 paired with the remote controller 200 in the storage unit 270 and refer to the information.

The control unit 280 provides overall control to the remote controller 200. The control unit 280 may transmit a signal corresponding to predetermined key manipulation on the user input unit 230 or a signal corresponding to the movement of the remote controller 200, which is sensed by the sensor portion 240 to the image display device 100 through the radio transceiver 220.

The voice acquisition unit 290 of the remote controller 200 may acquire voice.

The voice acquisition unit 290 may include at least one microphone. Accordingly, the voice acquisition unit 110 may acquire voice through the microphone.

The voice acquisition unit 290 may deliver the acquired voice to the control unit 280.

Hereinafter, the operating method of the image projection apparatus 100 will be described based on the description of the image projection apparatus 100.

FIG. 8 is a flowchart illustrating an operating method of the image projection apparatus according to an embodiment of the present invention.

Referring to FIG. 8, the sensing unit 105 of the image projection apparatus 100 senses a distance to the image projection area to which an image is projected (S110).

The sensing unit 105 may sense the distance to the image projection area to which the image is projected through various sensors. For example, the sensing unit 105 may sense the distance to the image projection area, to which the image is projected, through the distance sensor 106.

The distance to the image projection area to which the image is projected may refer to the distance between the image projection apparatus 100 and the image projection area. Accordingly, the sensing unit 105 may sense the distance to an object or an area between the image projection apparatus 100 and the image projection area.

In addition, the sensing unit 105 may sense the distance to an area going beyond the above-described image projection area. For example, if the door 410 of the case 400 is the image projection area, the sensing unit 105 may sense the distance to the area going beyond the door 410. Accordingly, the sensing unit 105 may sense a user input to the image projection area. In this case, the user input may include a user input which is a touch to the door 410 to which the image is projected and a user input in the proximity to the door 410 within a predetermined distance from the door 410. The details thereof will be described below.

The control unit 170 of the image projection apparatus 100 determines at least one of the state of the image projection area based on the sensed distance, the state of the environment between the image projection apparatus 100 and the image projection area, and the state of the user input for the image projection area (S130).

The control unit 170 may determine the state of the image projection area based on the sensed distance.

According to an embodiment, the control unit 170 may determine the state of the door 410 of the case 400 which is the image projection area, based on the sensed distance. For example, the control unit 170 may determine the door 410 to be open if the sensed distance is equal to or more than a first distance which is a distance to the door 410 to which the image is projected. Accordingly, the control unit 170 may determine the open state of the door 410.

In addition, the control unit 170 may determine, based on the sensed distance, whether the image projection area is another area instead of a portion of the case 400. For example, the control unit 170 may determine the image projection area to be another area instead of the portion of the case 400 if the sensed distance is a second distance which is equal to or greater than the first distance.

According to another embodiment, the control unit 170 may determine the state of the environment between the image projection apparatus 100 and the image projection area, based on the sensed distance. For example, the control unit 170 may determine a certain object to be present between the door 410 and the image projection apparatus 100 if the sensed distance is less than the first distance which is a distance to the door 410 to which the image is projected. Accordingly, the control unit 170 may determine a portion or the entire portion of an image to be projected to the determined object without arriving at the door 410 to which a portion or the entire portion of the door 410 is to be projected, depending on the positions of the determined object. Accordingly, the control unit 170 may determine the portion or the entire portion of the image not to arrive at the door 410 which serves as the image projection area.

According to another embodiment, the control unit 170 may determine the state of the user input to the image projection area, based on the sensed distance. For example, the control unit 170 may determine the state of the user input to the image projection area, to which the image is projected, based on the variation of the sensing value corresponding to the sensed distance. According to an embodiment, the control unit 170 may recognize the user input to the door 410 based on the variation of the sensing value to the door 410 to which the image is projected. In this case, the user input may include a user input which is a touch to the door 410 to which the image is projected and a user input in the proximity to the door 410 within a predetermined distance from the door 410.

The control unit 170 of the image projection apparatus 100 operates based on the determined image projection state (S150).

According to an embodiment, the control unit 170 may reduce the brightness of an image, which is being projected, or may project the image to another area if the control unit 170 determines the state of the door 410 of the case 400 to be open.

According to another embodiment, if the control unit 170 determines the distance till an area, to which the image is projected, to be changed, the control unit 170 may project the image corresponding to the changed distance. Therefore, the control unit 170 may adjust at least one of the focus, the resolution, the size, the brightness, the color, and the lightness of the image projected by the image projection apparatus 180.

According to another embodiment, if the control unit 170 determines a certain object to be present between the image projection apparatus 100 and the image projection area, and if a portion or the entire portion of the image to be projected does not arrive at the image projection area due to the object, the control unit 170 may display an alarm, which notifies the presence of the obstacle related to image projection, on the image. In addition, the control unit 170 may output an alarm, which notifies the presence of the obstacle, in the form of audio through the audio output unit 185.

According to another embodiment, if the control unit 170 determines the user input to the image projection area to be recognized, the control unit 170 may operate based on the determined user input. For example, the control unit 170 may recognize the user input related to the operation of the image projection apparatus 100 and may perform the operation corresponding to the recognized user input. In this case, the user input related to the operation of the image projection apparatus 100 may be a user input for various operations such as image converting for the image displayed by the image projection apparatus 100, volume control for the output audio, and turning on and off of the image projection apparatus 100.

Meanwhile, the detailed embodiment of the operation of the image projection apparatus 100 will be described in detail.

FIG. 9 is a flowchart illustrating the detailed operation of the image projection apparatus according to an embodiment of the present invention.

Referring to FIG. 9, the sensing unit 105 of the image projection apparatus 100 senses a distance to the image projection area to which an image is projected (S200).

Then sensing unit 105 may include a distance sensor 106, and the distance sensor 106 may include a plurality of distance sensors 106a, 106b, 106c, and 106d. In addition, each of the distance sensors may sense the distance to the image projection area to which the image is projected.

The details thereof will be described with reference to FIG. 10.

Figure 10:
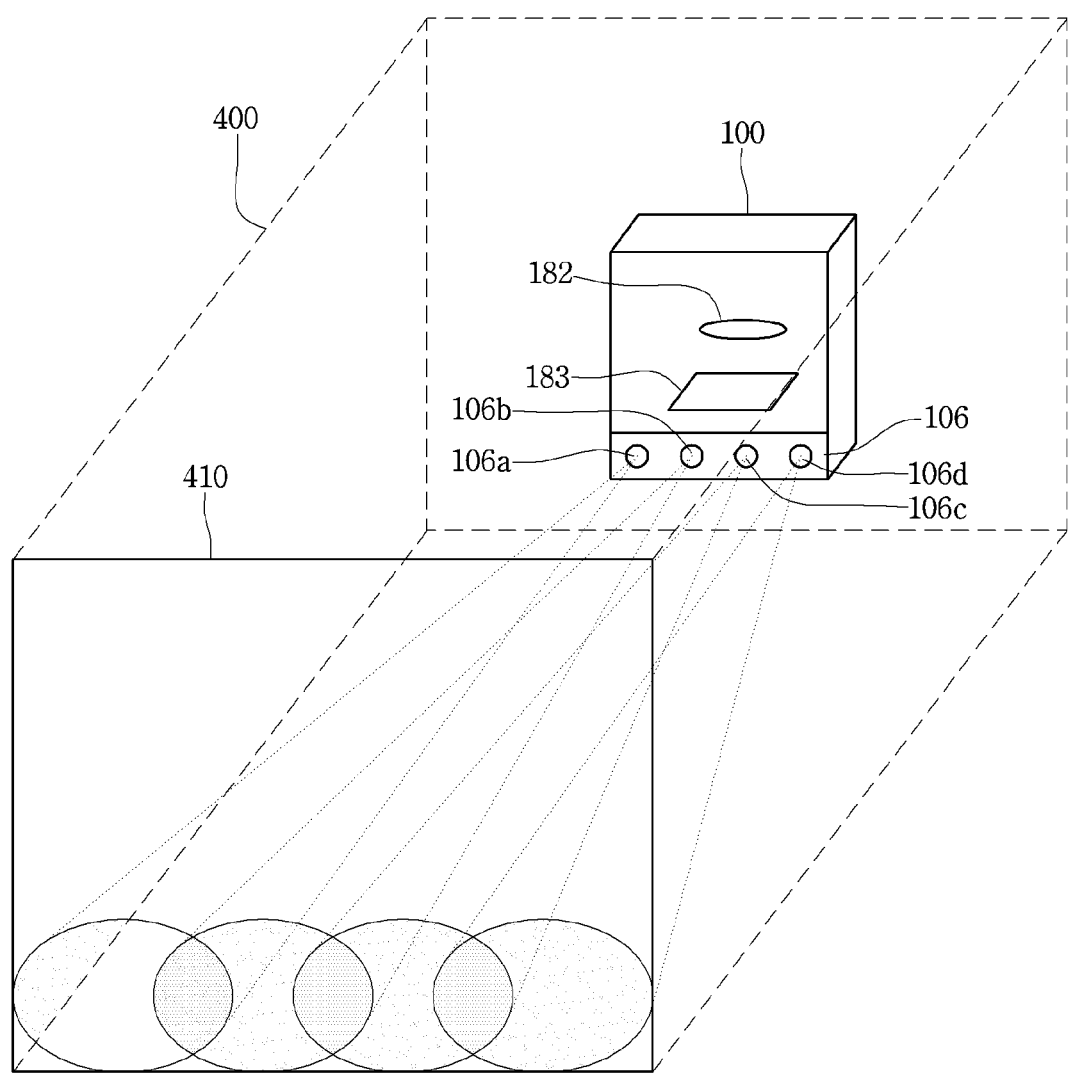
FIG. 10 is a view illustrating distance sensing of a distance sensor according to an embodiment of the present invention.

FIG. 10 is a view illustrating distance sensing of a distance sensor according to an embodiment of the present invention.

Referring to FIG. 10, the distance sensor 106 may include the distance sensors 106a, 106b, 106c, and 106d. Each of the distance sensors 106a, 106b, 106c, and 106d may sense the distance to the door 410 serving as an area to which the image is projected. Meanwhile, areas sensed by the distance sensors 106a, 106b, 106c, and 106d may be partially or entirely overlapped with each other. Accordingly, the distance sensors 106a, 106b, 106c, and 106d may sense mutually different areas. In addition, the number of distance sensors included in the distance sensor 106 may be varied, and the distance sensors may be provided at various positions of the image projection apparatus 100. Accordingly, the distance sensors included in the distance sensor 106 may sense distances at various angles or various directions with respect to the area to which the image is projected.

Since the sensing of the distance by the sensing unit 105 has been described, the details thereof will be omitted.

The control unit 170 determines, based on the sensed distance, whether an obstacle is present between the image projection apparatus 100 and the image projection area (S201). If the control unit 170 determines that the obstacle is absent, the control unit 170 projects an image to the image projection area (S203).

According to an embodiment, the control unit 170 may determine the state of the environment between the image projection apparatus 100 and the image projection area, based on the sensed distance. For example, the control unit 170 may determine a certain object to be present between the door 410 and the image projection apparatus 100 if the sensed distance is less than the first distance which is a distance to the door 410 to which the image is projected. Accordingly, the control unit 170 may determine, depending on the position of the determined object, a portion or the entire portion of an image to be projected to the determined object without arriving at the door 410 to which a portion or the entire portion of the image s to be projected. Accordingly, the control unit 170 may determine the portion or the entire portion of the image not to arrive at the door 410 which serves as the image projection area.

For example, the control unit 170 may determine a certain object to be present between the door 410 and the image projection apparatus 100 if the sensed distance is less than the first distance which is a distance to the door 410 to which the image is projected.

If the control unit 170 determines that the obstacle is absent between the image projection apparatus 100 and the image projection area, the control unit 170 may project an image to the image projection area by the image projection unit 180.

For example, the control unit 170 may project an area to the door 410 serving as the image projection area through the image projection unit 180. Accordingly, an image screen 500, on which the image projected from the image projection unit 180 is displayed, may be displayed on a door 410 of the case 400.

Meanwhile the control unit 170 determines, based on the sensed distance, whether there is present an obstacle between the image projection apparatus 100 and the image projection area (S201). If the control unit 170 determines the obstacle to be present, the control unit 170 represents an alarm to notify that the obstacle is recognized (S213).

The control unit 170 may determine whether the obstacle is present in the whole space or a partial space between the image projection apparatus 100 and the image projection area through the distance sensor 106 included in the sensing unit 105.

The details thereof will be described with reference to FIG. 11.

Figure 11:
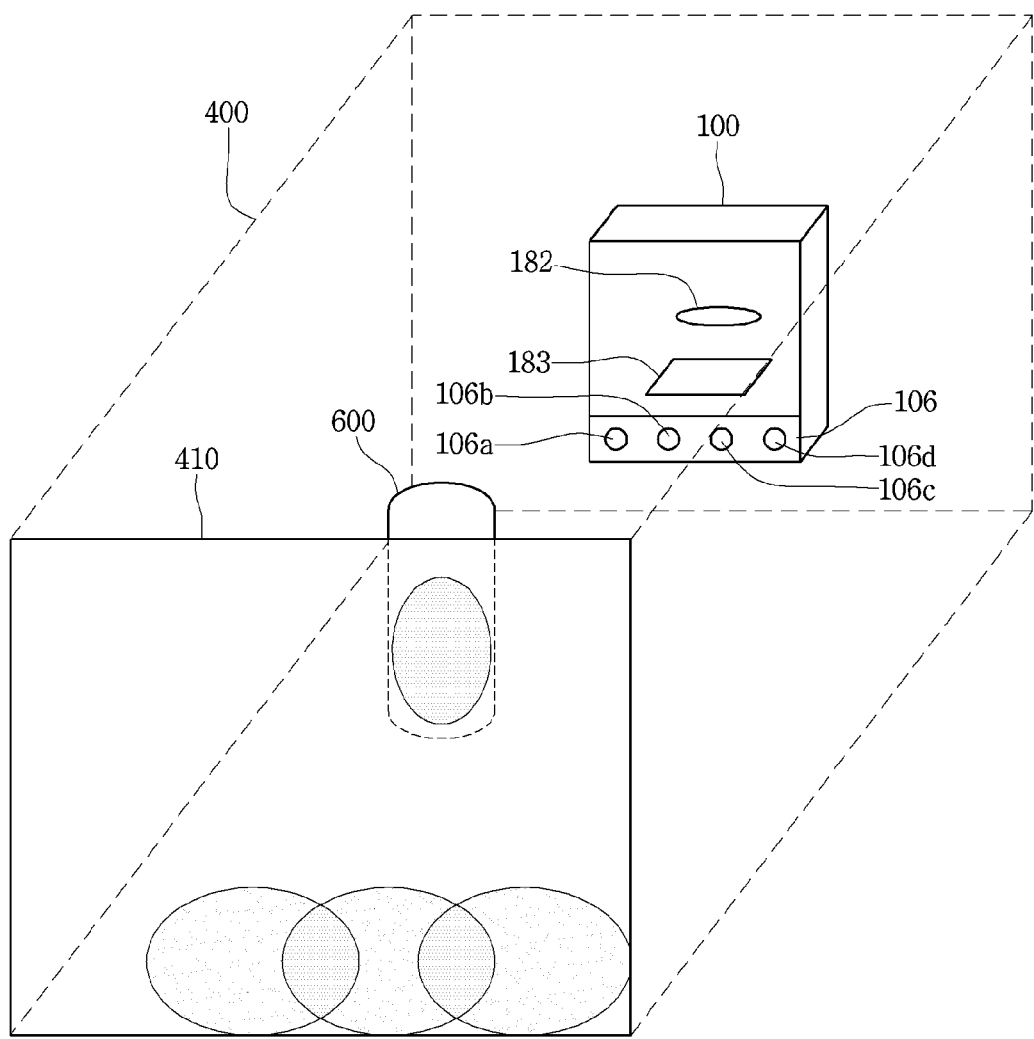
FIG. 11 is a conceptual view illustrating obstacle recognition according to an embodiment of the present invention.

FIG. 11 is a conceptual view illustrating obstacle recognition according to an embodiment of the present invention.

Referring to FIG. 11, the distance sensor 106 may sense the distance to the image projection area through a plurality of sensors, and may sense an obstacle 600 between the door 410, which is the image projection area, and the image projection apparatus 100. In addition, if a sensed value by one distance sensor 106a among a plurality of distance sensors 106 is different from sensed values by remaining distance sensors 106a, 106b, 106c, and 106d, the control unit 170 may determine the obstacle 600 to be present between the door 410 and the image projection apparatus 100.

If the control unit 170 determines to be present between the image projection area and the image projection apparatus 100, the control unit 170 may represent an alarm to notify that the obstacle is present on the projected image screen 500. In addition, the control unit 170 may output an alarm to notify that the obstacle is present through the audio output unit 185.

The control unit 170 of the image projection apparatus 100 avoids the recognized obstacle to project the image to the image projection area (S215).

According to an embodiment, the control unit 170 may avoid the recognized obstacle and may project the image to the partial area of the image projection area. In addition, the control unit 170 may avoid the recognized obstacle and may adjust the size of the image projected to the image projection area.

The details thereof will be described with reference to FIG. 12.

Figure 12:
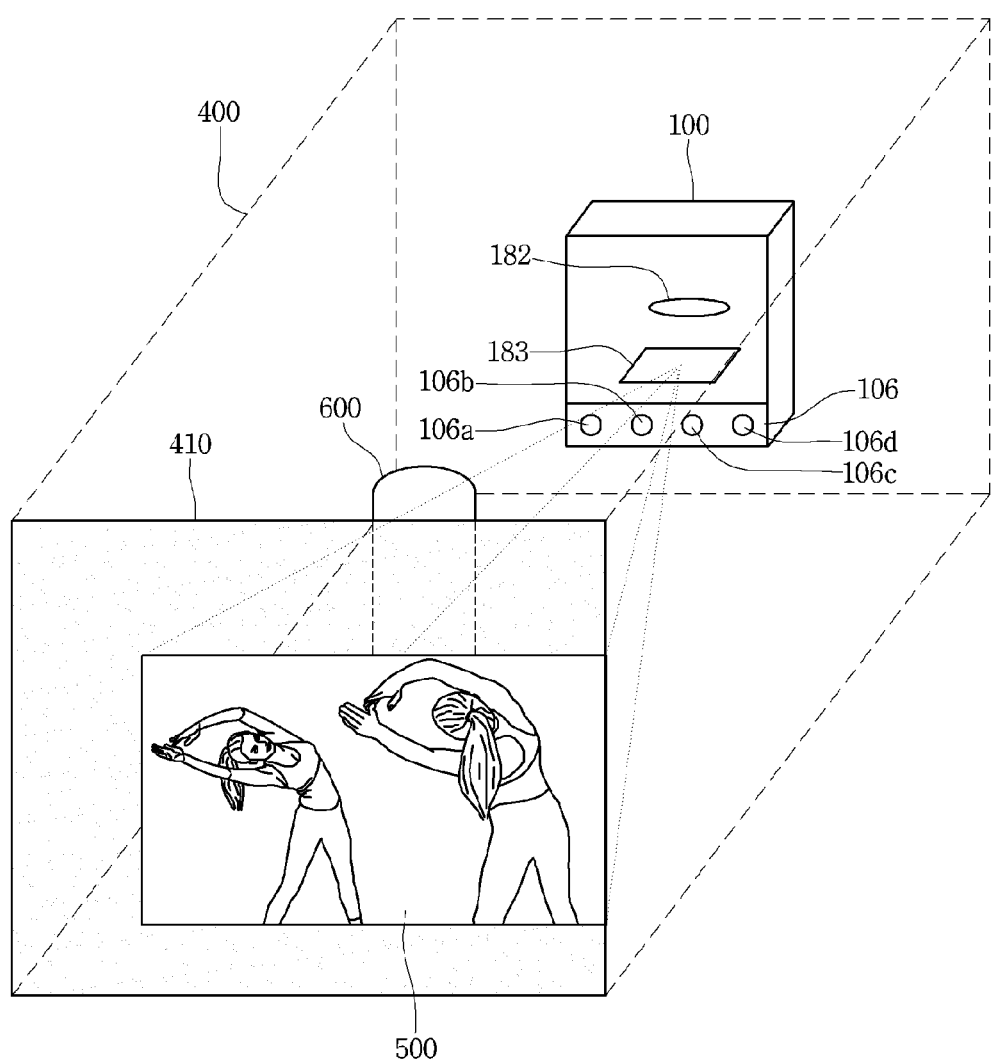
FIG. 12 is a view illustrating image projection for avoiding an obstacle according to an embodiment of the present invention.

FIG. 12 is a view illustrating image projection for avoiding an obstacle according to an embodiment of the present invention.

Referring to FIG. 12, the control unit 170 may reduce the size of the projected image to project the entire image to the door 410, which is the image projection area, without projecting the image to the recognized obstacle 600. Accordingly, the control unit 170 may reduce the size of the image projected to the door 410 through the image projection unit 180.

According to another embodiment, the control unit 170 may avoid the recognized obstacle and may project the image to another area instead of the area to which the image is projected.

The details thereof will be described with reference to FIG. 13.

Figure 13:
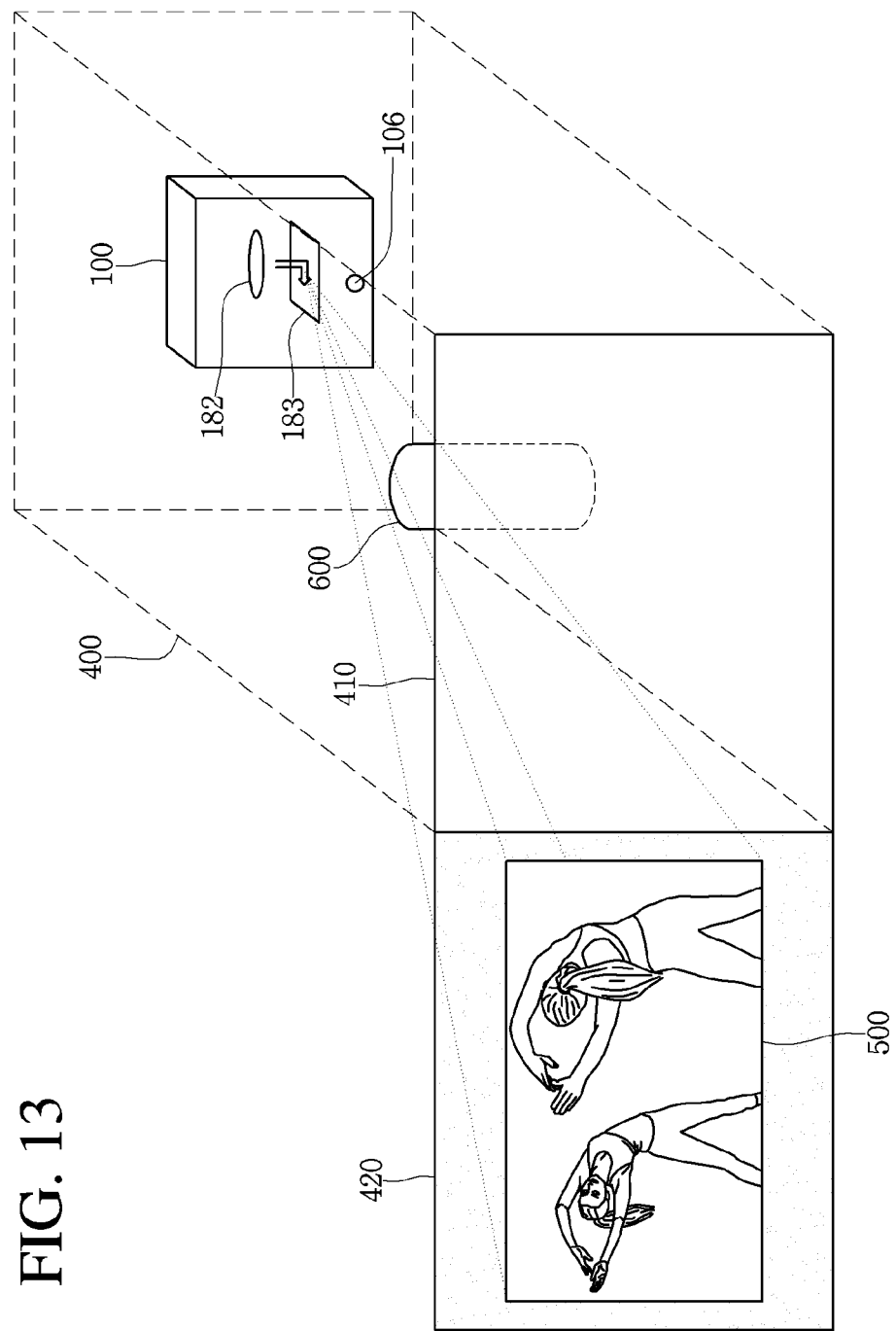
FIG. 13 is a view illustrating image projection to an adjacent door according to an embodiment of the present invention.

FIG. 13 is a view illustrating image projection to an adjacent door according to an embodiment of the present invention.

Referring to FIG. 13, the control unit 170 may project the image to an adjacent door 420, which is another area, instead of the door 410 to which the entire image or the partial image fails to be projected due to the recognized obstacle 600. In detail, the control unit 170 may adjust an image projection angle of the image projection unit 180 and may project the image to the adjacent door 420 through the image projection unit 180 having the adjusted angle. Accordingly, the image screen 500, on which the image projected from the image projection unit 180 is displayed, may be displayed on the adjacent door 420.

Description will be made again with reference to FIG. 9.

The control unit 170 determines whether a user input to the image screen 500, on which the image projection area is displayed, is recognized, based on the sensed distance (S205). If the user input is recognized, the control unit 170 performs an operation corresponding to the recognized user input (S207).

For example, the control unit 170 may determine the state of a user input to the image projection area, to which the image is projected, based on the variation of a sensing value corresponding to the sensed distance. In detail, the control unit 170 may recognize a user input to an area in which the variation of the sensed value corresponding to the sensed distance is equal to or more than a reference value.

The details thereof will be described with reference to FIGS. 14 and 15.

Figure 14:
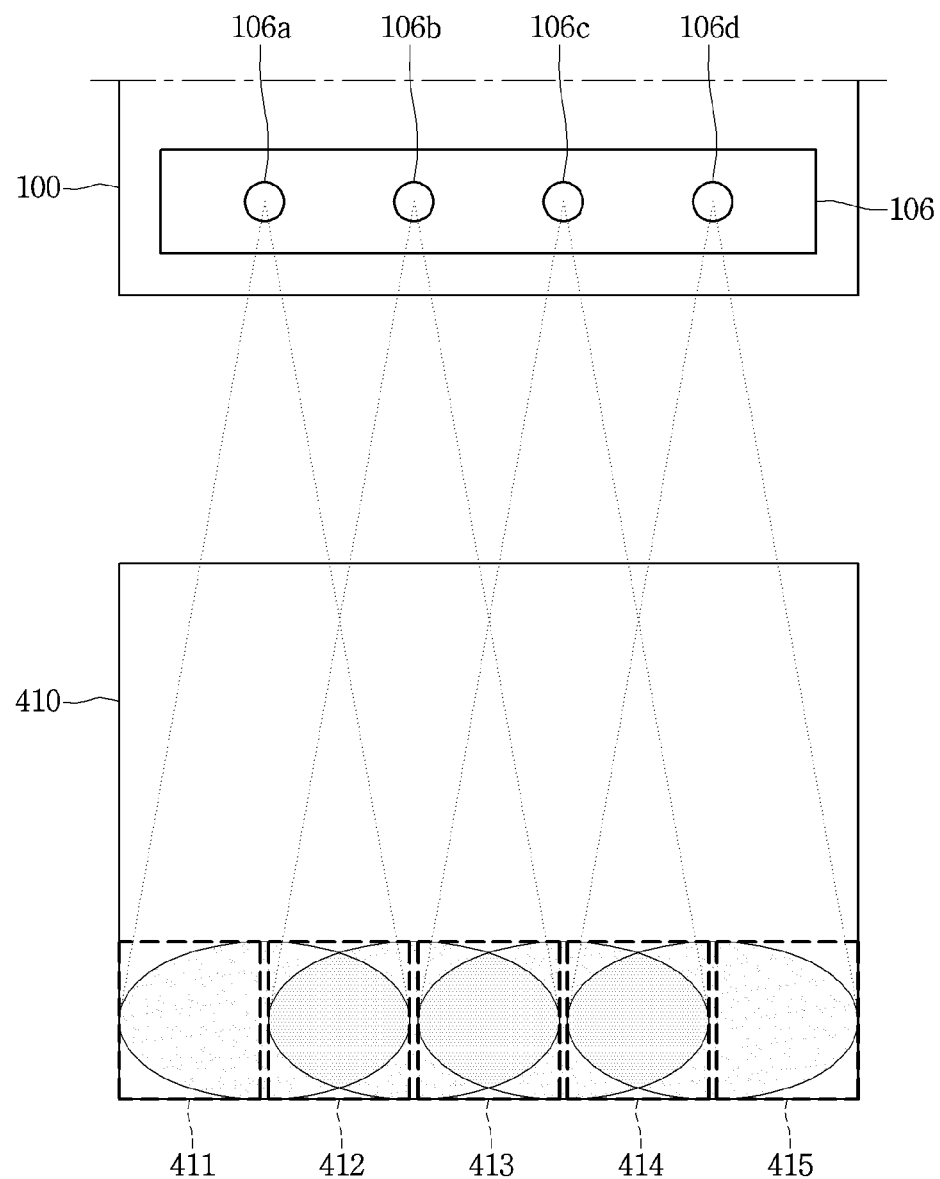
FIG. 14 is a view illustrating sensing to a user input according to an embodiment of the present invention.

FIG. 14 is a view illustrating sensing to a user input according to an embodiment of the present invention.

Referring to FIG. 14, the distance sensors 106a, 106b, 106c, and 106c included in the distance sensor 106 may sense mutually different areas of the door 410 serving as an area in which the image is projected. In addition, the control unit 170 may recognize, based on the variation of the sensed values by the distance sensors 106a, 106b, 106c, and 106d, user inputs to a first area 411, a second area 412, a third area 413, a fourth area 414, and a fifth area 415 included in the door 410. In detail, the control unit 170 may recognize the user inputs to the first area 411 corresponding to the first distance sensor 106a, the second area 412 corresponding to the first distance sensor 106a and the second distance sensor 106b, the third area 413 corresponding to the second distance sensor 106b and the third distance sensor 106c, the fourth area 414 corresponding to the third distance sensor 106c and the fourth distance sensor 106d, and the fifth area 415 corresponding to the fourth distance sensor 106d. In this case, the user input may include the user inputs of touching to the first area 411, the second area 412, the third area 413, the fourth area 414, and the fifth area 415 included in the door 410, and a user input in the proximity to the door 410 within a predetermined distance from the door 410.

In addition, the control unit 170 may display a function user interface (UI) which shows the functions corresponding to the first to fifth areas 411, 412, 413, 414, and 415, which are a plurality of areas of the image projection area, on the image screen 500. In addition, the control unit 170 may recognize a user input to the function UI and may perform a function corresponding to the function UI based on the recognized user input. The details thereof will be described with reference to FIG. 15.

Figure 15:
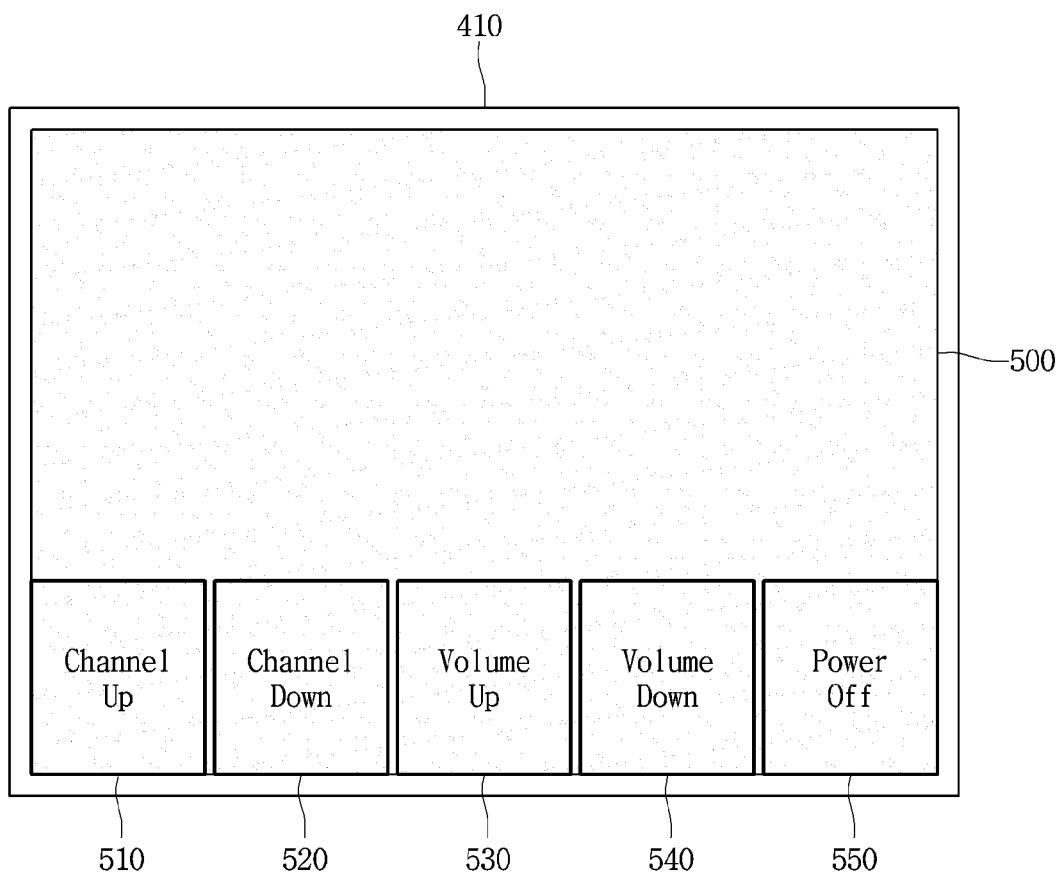
FIG. 15 is a view illustrating a UI display screen according to an embodiment of the present invention.

FIG. 15 is a view illustrating a UI display screen according to an embodiment of the present invention.

Referring to FIG. 15, the control unit 170 may display function UIs, which correspond to the areas for recognizing the user inputs, on an image projected to the door 410 serving as the image projection area through the image projection unit 180. For example, the control unit 170 may display the first UI 510 corresponding to the first area 411, the second UI 520 corresponding to the second area 412, the third UI 530 corresponding to the third area 413, the fourth UI 540 corresponding to the fourth area, and the fifth UI 550 corresponding to the fifth area 415, on the image screen 500 projected to the door 410 by the image projection unit 180. In this case, the first UI 510 may correspond to "channel-up", and the second UI 520 may correspond to "channel-down". The third UI 530 may correspond to "volume-up" and the fourth UP 540 may correspond to "volume-down". The fifth UI 550 may correspond to "power-off". If the control unit 170 recognizes the user inputs corresponding to the first to fifth UIs 510, 520, 530, 540, and 550, the control unit 170 may perform the operation corresponding to the recognized user input.

Meanwhile, the details of the above function UIs and the function operations are provided for the illustrated purpose, and various functions may be implemented according to the settings of the user or a designer.

Description will be made again with reference to FIG. 9.

The control unit 170 determines, based on the sensed distance, the door open state of the door serving as the image projection area to which the image is projected (S209). The control unit 170 adjusts an image projected by the image projection unit 180 if the control unit 410 determines the door 410 to be open (S211).

According to an embodiment, the control unit 170 may determine the state of the door 410 of the case 400 which serves as the image projection area based on the sensed distance. For example, the control unit 170 may determine the door 410 to be open if the sensed distance is equal to or more than a first distance which is a distance to the door 410 to which the image is projected. Accordingly, the control unit 170 may determine the open state of the door 410.

The details thereof will be described with reference to FIG. 16.

Figure 16:
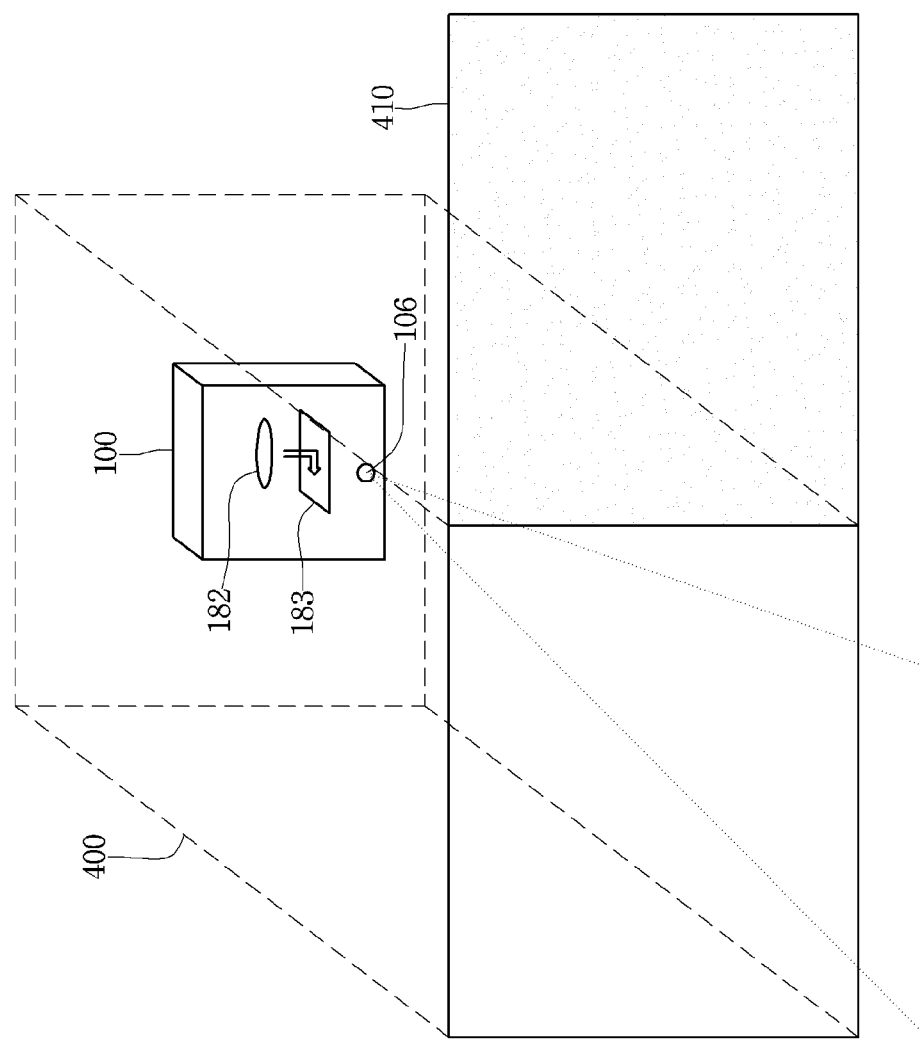
FIG. 16 is a view illustrating door open recognition according to an embodiment of the present invention.

FIG. 16 is a view illustrating door open recognition according to an embodiment of the present invention.

Referring to FIG. 16, the distance sensor 106 may sense a distance related to a direction corresponding to the area to which the image is projected. If the door 410 to which the image is projected is open, the distance sensor 106 may sense that the value of the sensed distance is increased. Accordingly, the control unit 170 may recognize the open of the door 410 based on the sensed distance.

If the control unit 170 recognizes that the door 410, to which the image is projected, is open, the control unit 170 may reduce the brightness of the image projected by the image projection unit 180.

If the control unit 170 recognizes that the door 410, to which the image is projected, is open, the control unit 170 may stop the image projection unit 180 performing the image projection.

In addition, if the control unit 170 recognizes that the door 410, to which the image is projected, is open, the control unit 170 may project the image to another area.

The details thereof will be described with reference to FIG. 17.

Figure 17:
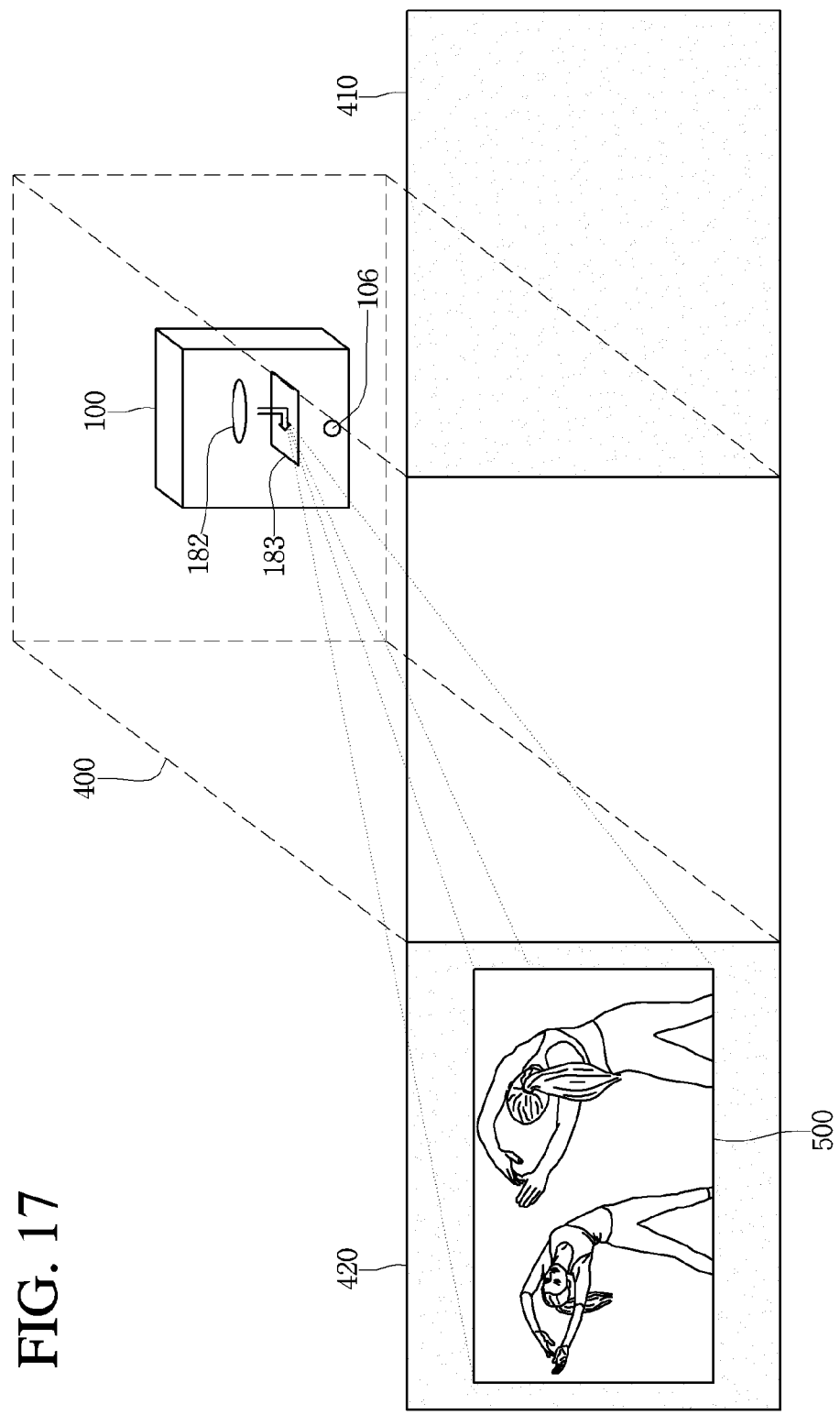
FIG. 17 is a view illustrating image projection to an adjacent door according to another embodiment of the present invention.

FIG. 17 is a view illustrating image projection to an adjacent door according to another embodiment of the present invention.

Referring to FIG. 17, if the control unit 170 recognizes that the door 410 is open, the control unit 170 may control the image projection unit 180 to project an image to a adjacent door 420 serving as another area. In detail, the control unit 170 may adjust an image projection angle of the image projection unit 180 and may project the image to the adjacent door 420 through the image projection unit 180 having the adjusted angle. Accordingly, the image screen 500, on which the image projected from the image projection unit 180 is displayed, may be displayed on the adjacent door 420.

Meanwhile, the control unit 170 may acquire on the movement of the area, to which the image is projected, from a magnet type sensor or a switch type sensor, may adjust the brightness of the projected image based on the acquire information, and may stop the image projection operation. In addition, the control unit 170 may project the projected area to another area based on the acquired information.

As described above, according to the present invention, the image projection apparatus 100 may project the image to another area if the door 410, to which the image is projected, is open.

Meanwhile, the description of the image adjusting according to the open of the door is provided for the illustrative purpose. According to the settings of the user or the designer, an image projected in various manners or to various areas may be adjusted.

According to the present invention, the image projection apparatus 100 may project an image to various distances, and may display image screens in various sizes according to the distances to the point to which the image is projected.

For example, the image projection apparatus 100 may project an image to a distance farther than the distance to the door 410 of the case 400. Accordingly, the image projection apparatus 100 may display an image screen larger than that of the image screen 500 which has been projected to the door 410.

The details thereof will be described with reference to FIGS. 18 to 20

Figure 18:
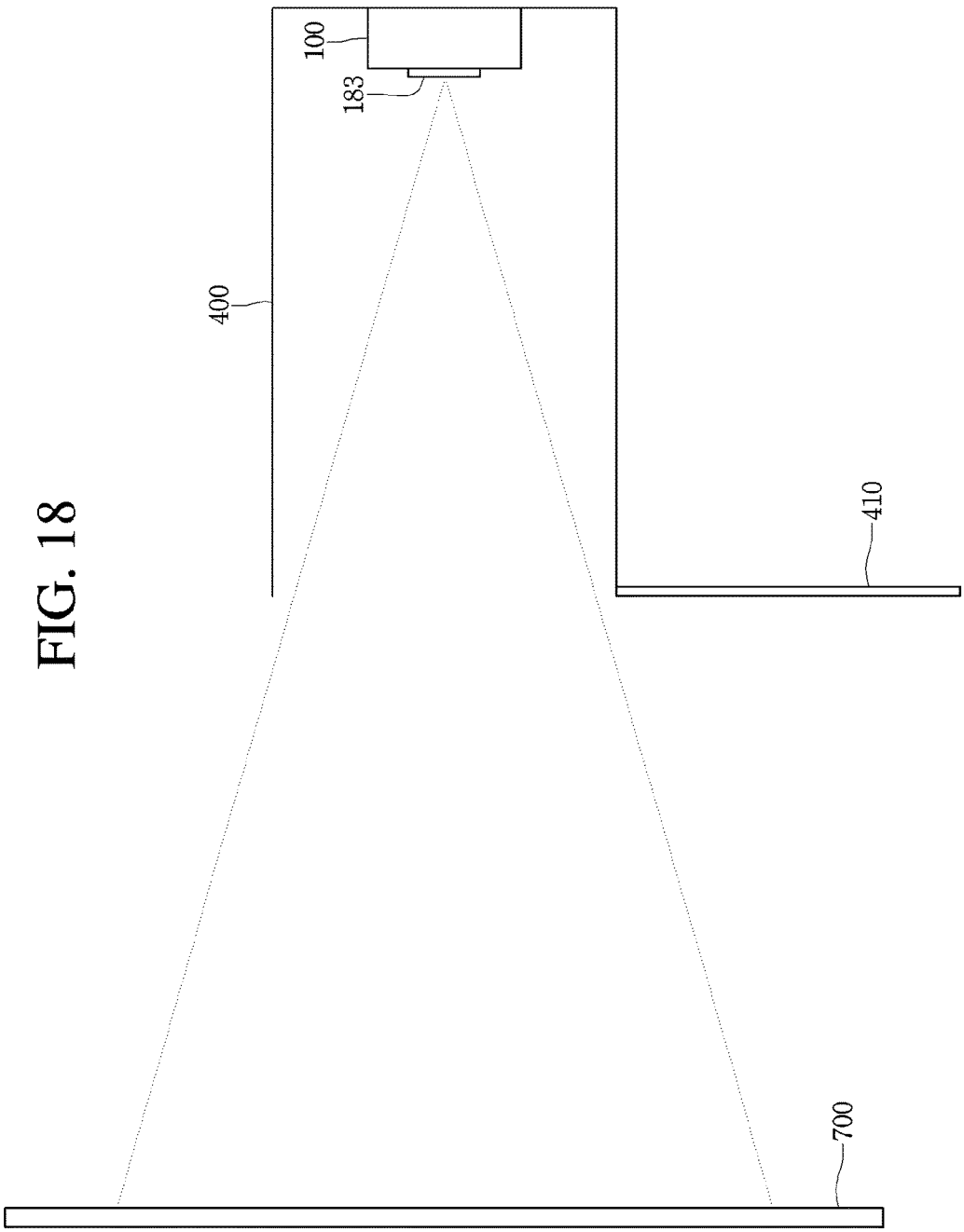
FIG. 18 is a conceptual view illustrating image projection according to another embodiment of the present invention.

FIG. 18 is a conceptual view illustrating image projection according to another embodiment of the present invention.

Referring to FIG. 18, the image projection apparatus 100 may project an image to a wall surface 700 farther than the door 410 of the case 400. According to an embodiment, if the control unit 170 recognizes that the door 410 is open, the control unit 170 may control the image projection operation of the image projection unit 180 such that the image is projected to the wall surface 700 at a farther place. In detail, the distance sensor 106 may sense the distance to the wall surface 700. The control unit 170 may adjust at least one of the focus, the resolution, the size, the brightness, the color, and the lightness of the image projected by the image projection unit 180. The image projection unit 180 may project an image to the wall surface 700 based on at least one of the focus, the resolution, the size, the brightness, the color, and the lightness which are adjusted. Accordingly, the image projection apparatus 100 may project the optimal image to the wall surface 700 farther than the door 410.

Meanwhile, the door 410 may include a plurality of panels. For example, the door 410 may include a screen panel 412 and a transmissive panel 415. The screen panel 412 and the transmissive panel 415 of the door 410 may be separated from the door 410 in a sliding manner or a detaching manner. Accordingly, as the screen panel 412 or the transmissive panel 415 of the door 410 slides or is detached or attached, the area for the image projected by the image projection apparatus 100 may be adjusted.

The details thereof will be described in detail with reference to FIGS. 19 and 20.

Figure 19:
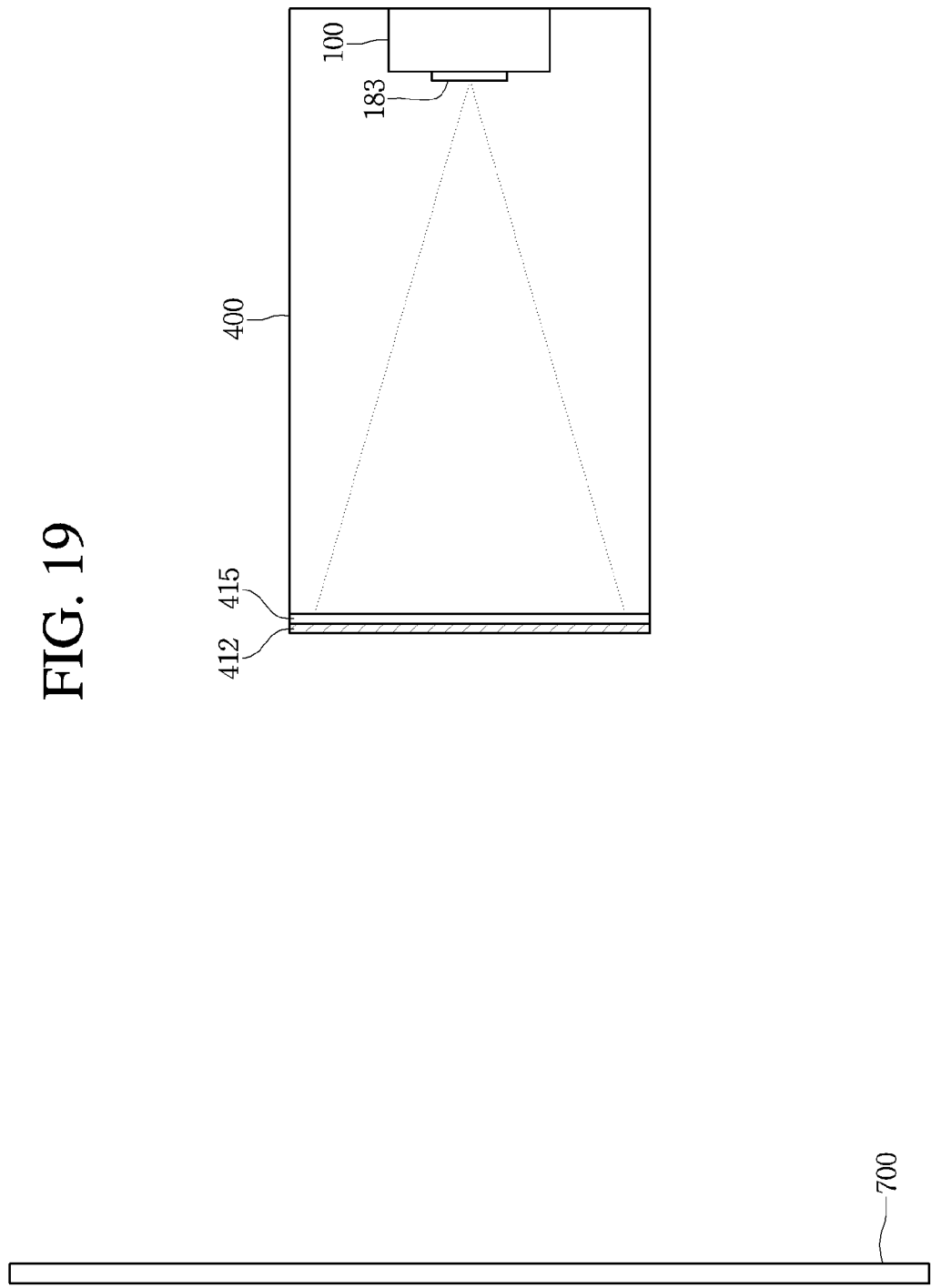
FIG. 19 is a view illustrating image projection to a door according to an embodiment of the present invention.

FIG. 19 is a view illustrating image projection to a door according to an embodiment of the present invention.

Referring to FIG. 19, the door 410 may include the screen panel 412 and the transmissive panel 415. Accordingly, the image projected by the image projection apparatus 100 may be projected to the door 410 instead of passing through the door 410. Accordingly, the image screen 500, on which the image projected from the image projection unit 180 is displayed, may be displayed on the door 410.

Figure 20:
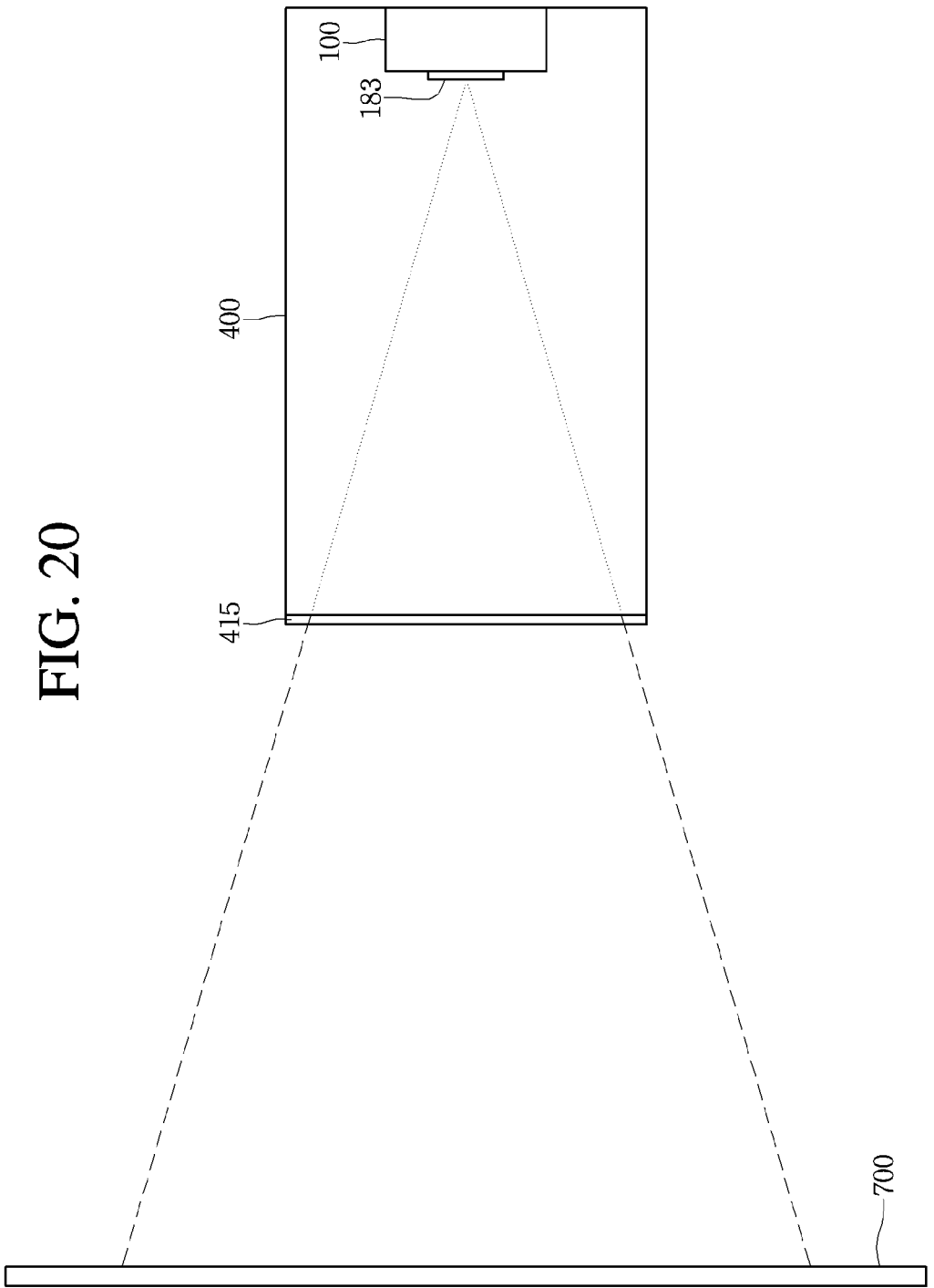
FIG. 20 is a view illustrating image projection to a wall surface according to an embodiment of the present invention.

FIG. 20 is a view illustrating image projection to a wall surface according to an embodiment of the present invention.

Referring to FIG. 20, the screen panel 412 may be separated from the door 410, and the transmissive panel 415 may be included in the door 410. Accordingly, the image projected by the image projection apparatus may pass through the door 410. Accordingly, the image screen 500, on which the image projected by the image projection unit 180 is displayed, may be displayed on the wall surface 700.

Meanwhile, the door 410 may have the structure, the transparency of which may be electrically adjusted. For example, the door 410 may include a material representing electrochromism. Accordingly, a user may electrically adjust the transparency of the door 410. Accordingly, the image projection apparatus 100 may project the image to the door 410 or the wall surface 700 as the transparency of the door 410 is adjusted.

Meanwhile, according to the present invention, the control unit 170 of the image projection apparatus 100 may control the audio output device 300. For example, the control unit 170 of the image projection apparatus 100 may control the audio output device 300 to output audio corresponding to the projected image. In addition, the control unit 170 of the image projection apparatus may control a lighting operation of a lighting unit 350 included in the audio output device 300.

The details thereof will be described in detail with reference to FIGS. 21 and 22.

Figure 21:
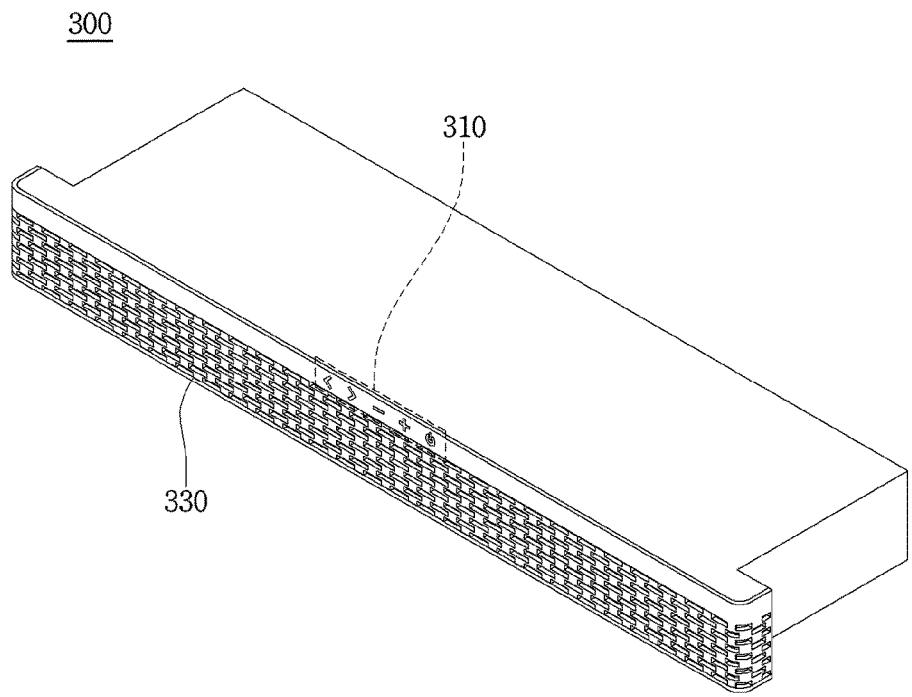
FIG. 21 is a view illustrating an actual configuration of an audio output device according to an embodiment of the present invention.

FIG. 21 is a view illustrating an actual configuration of an audio output device according to an embodiment of the present invention.

Referring to FIG. 21, the audio output device 300 may include a manipulation unit 310, which acquires a user input, and a speaker unit 330 which outputs audio.

The control unit 170 of the image projection apparatus 100 may output the audio corresponding to the projected image through the speaker unit 330 of the audio output device 300.

The audio output device 330 may acquire a user input to the manipulation unit 310 and may deliver the acquire user input to the image projection apparatus 100. The control unit 170 of the image projection apparatus 100 of the image projection apparatus may perform an operation corresponding to the delivered user input.

Meanwhile, the audio output device 330 may be provided at one surface or one lateral surface of the case 400 having the image projection apparatus 100.

In addition, the audio output device 300 may further include a lighting unit 350 which emits light.

The lighting unit 350 may emit light in a specific direction. For example, the lighting unit 350 may emit light downward from the case 400 having the audio output device 300. The details thereof will be described with reference to FIG. 22.

Figure 22:
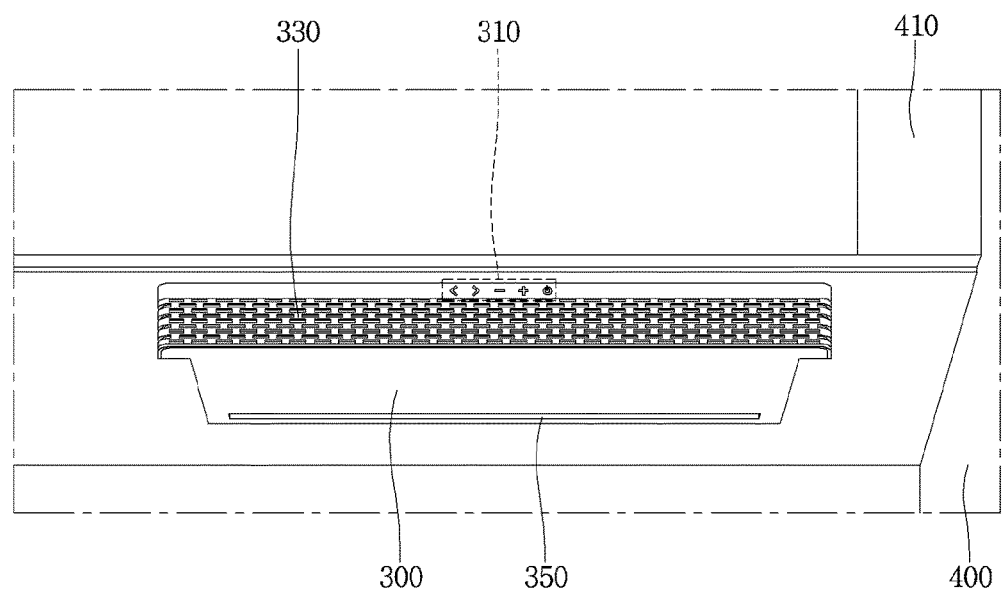
FIG. 22 is a view illustrating the audio output device according to an embodiment of the present invention.

FIG. 22 is a view illustrating the audio output device 300 according to an embodiment of the present invention.

Referring to FIG. 22, the audio output device 300 may be provided at a lower end of the case 400. In the audio output device 300, the lighting unit 350 may emit light according to the user input to the manipulation unit 310 or under the control of the control unit 170 of the image projection apparatus 100.

According to an embodiment, in the case that the case 400 is a closet installed in a kitchen room, the audio output device 300 may be provided at a lower end or one lateral surface of the closet. The lighting unit 350 included in the audio output device 300 may emit light downward of the closet. Accordingly, the lighting unit 350 may serve as a typical lighting device or a desk lamp.

Meanwhile, the lighting unit 350 may emit light in at least one color and may emit light at various light emitting pattern.

The lighting unit 350 may emit light in an alarming situation.

In this case, the alarming situation may refer to at least one of a schedule set by a user, a disastrous situation, an alarm acquired from an interworking terminal (not illustrated), and an alarm acquired from an interworking home network.

According to an embodiment, the control unit 170 of the image projection apparatus 100 may control the lighting unit 350 of the audio output device 300 in case of disaster, such as fire or earthquake. In this case, the control unit 170 may control the lighting unit 350 to emit light in various colors or at various light emission patterns.

According to another embodiment, the control unit 170 may acquire alarm information from the interworking terminal (not illustrated) and may control the lighting unit 350 of the audio output device 300 to emit light corresponding to the acquired alarm information. For example, the control unit 170 may receive a call from the interworking terminal (not illustrated), acquire the alarm information on the reception of the message, and control the lighting unit 350 of the audio output device 300 to perform a light emission operation of receiving the call or the message. Meanwhile, the above terminal may include various terminals such as a personal terminal, a home terminal, and an office terminal.

According to another embodiment, the control unit 170 may acquire alarm information from the interworking home network and may control the lighting unit 350 of the audio output device 300 to emit light corresponding to the acquired alarm information. For example, the control unit 170 may acquire notification information of a visitor from the interworking home network and may control the lighting unit 350 of the audio output device 300 to perform a lighting operation of notifying that there is present the visitor.

In addition, the control unit 170 may control the lighting unit 350 to emit light corresponding to various alarms. For example, the control unit 170 may control the lighting unit 350 to emit light if motion is detected in an area in which the image projection apparatus 100 is provided or another area.

Therefore, according to the present invention, the image projection apparatus 100 and the audio output device 300 may provide the alarm information through the lighting unit 350 under various environments.

As described above, the lighting unit 350 of the audio output device 300 may notify a user of alarm information on various alarm situations through the light emitting operation. Accordingly, even if it is difficulty for the user to recognize the alarm information due to noise, the user may recognize the alarm information through the light emitting operation of the lighting unit 350. In addition, the user may easily recognize the alarm for the terminal in a remote place.

Meanwhile, the above description of the operation of the audio output device 300 is provided for the illustrative purpose, but the present invention is not limited thereto. Therefore, various operations may be set depending on the selection of the user or the designer.

Hereinafter, a user input of the image projection apparatus 100 according to another embodiment of the present invention will be described.

First, still another embodiment of the image projection of the image projection apparatus 100 will be described.

Figure 23:
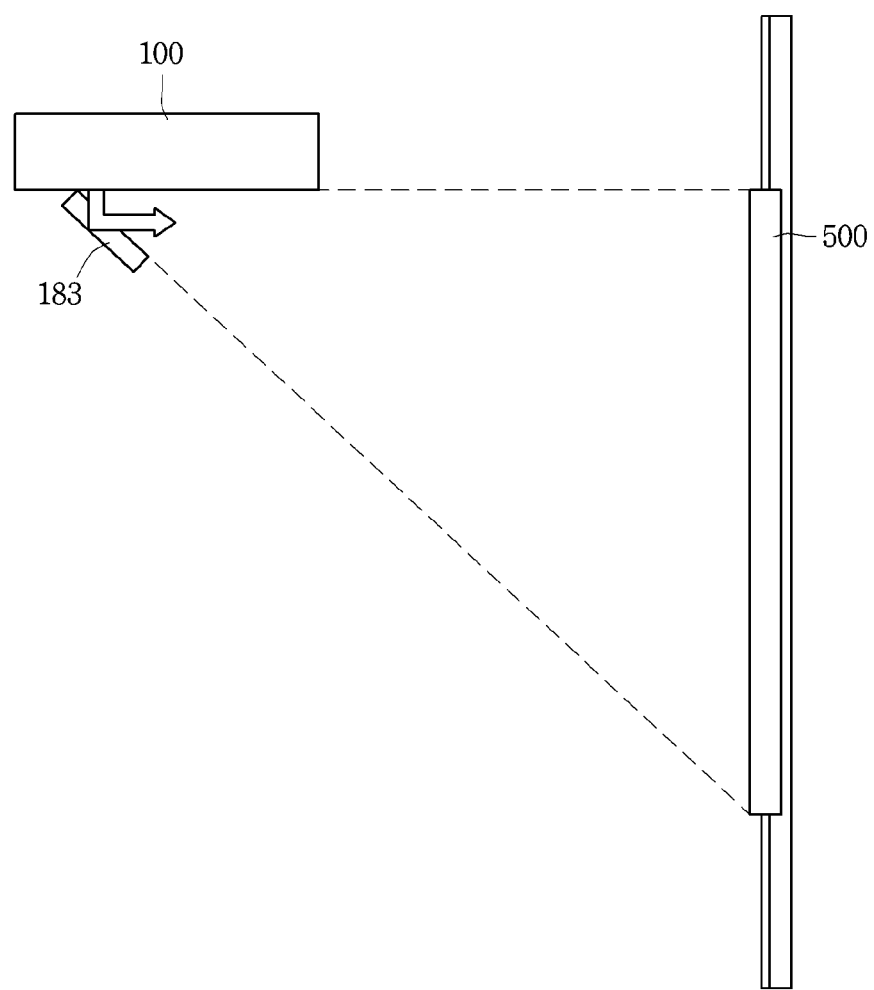
FIG. 23 is a conceptual view illustrating image projection according to an embodiment of the present invention.

FIG. 23 is a conceptual view illustrating image projection according to an embodiment of the present invention Referring to FIG. 23, the image projection unit 180 may project the image to the projection point as the beam emitted from the light emitting unit 181 passes through the lens unit 182, and is reflected from the reflection unit 183. Accordingly, the image screen 400, on which the image projected by the image projection unit 180 is displayed, may be displayed on one surface to which the image is projected.

Figure 24:
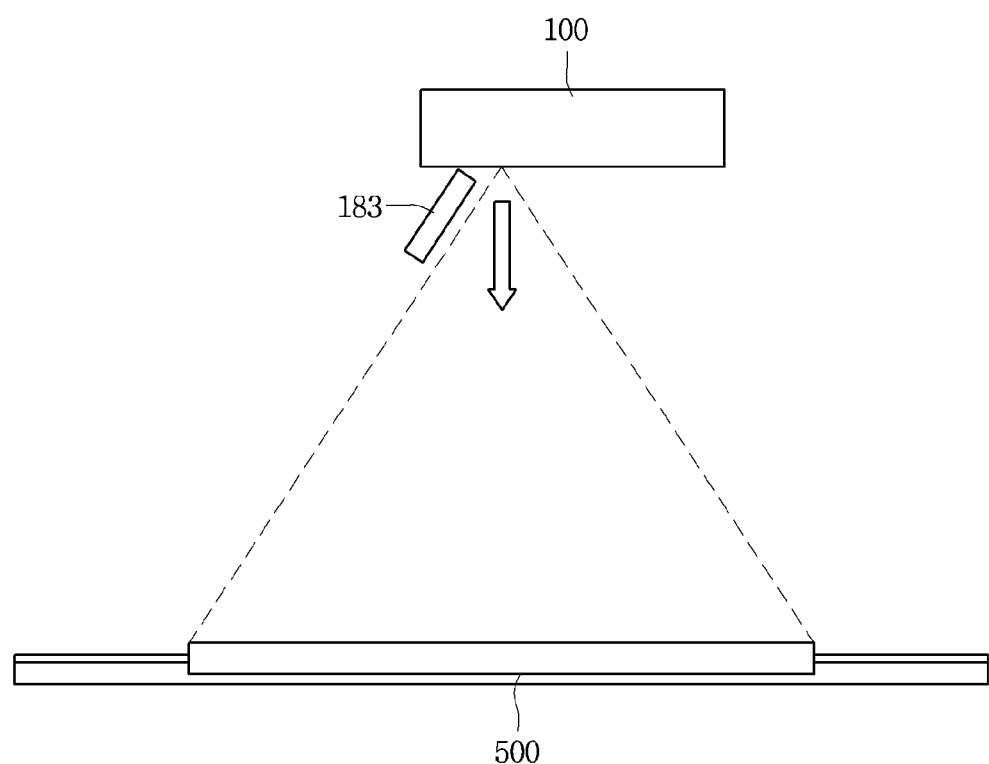
FIG. 24 is a conceptual view illustrating image projection according to an embodiment of the present invention.

FIG. 24 is a conceptual view illustrating image projection according to an embodiment of the present invention.

Referring to FIG. 24, the image projection unit 180 may project the image to the projection point as the beam emitted from the light emitting unit 181 passes through the lens unit 182. Accordingly, the image screen 400, on which the projected image projected from the image projection unit 180 is displayed, may be displayed on one surface to which the image is projected.

As described above, the image projection unit 180 may project the image in various projection directions by using the reflection unit 183.

Figure 25:
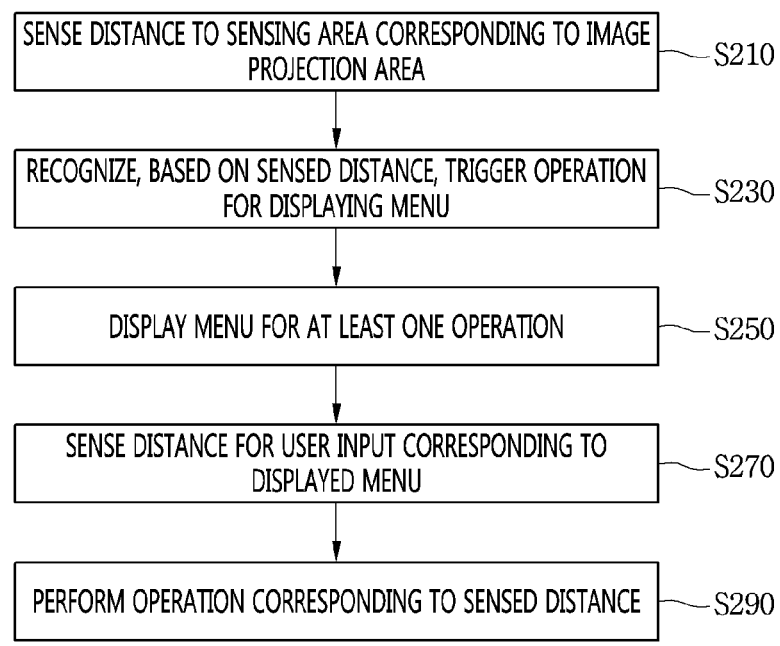
FIG. 25 is a flowchart illustrating an operating method of the image projection apparatus according to an embodiment of the present invention.

FIG. 25 is a flowchart illustrating an operating method of the image projection apparatus according to an embodiment of the present invention.

Referring to FIG. 25, the sensing unit 106 of the image projection apparatus senses a distance to a sensing area corresponding to the image projection area, to which the image is projected, (S210).

The distance sensor 106 may sense the distance to the sensing area corresponding to the image projection area, to which the image is projected, in a direction opposite to the distance sensor 106.

The details thereof will be described with reference to FIG. 26.

Figure 26:
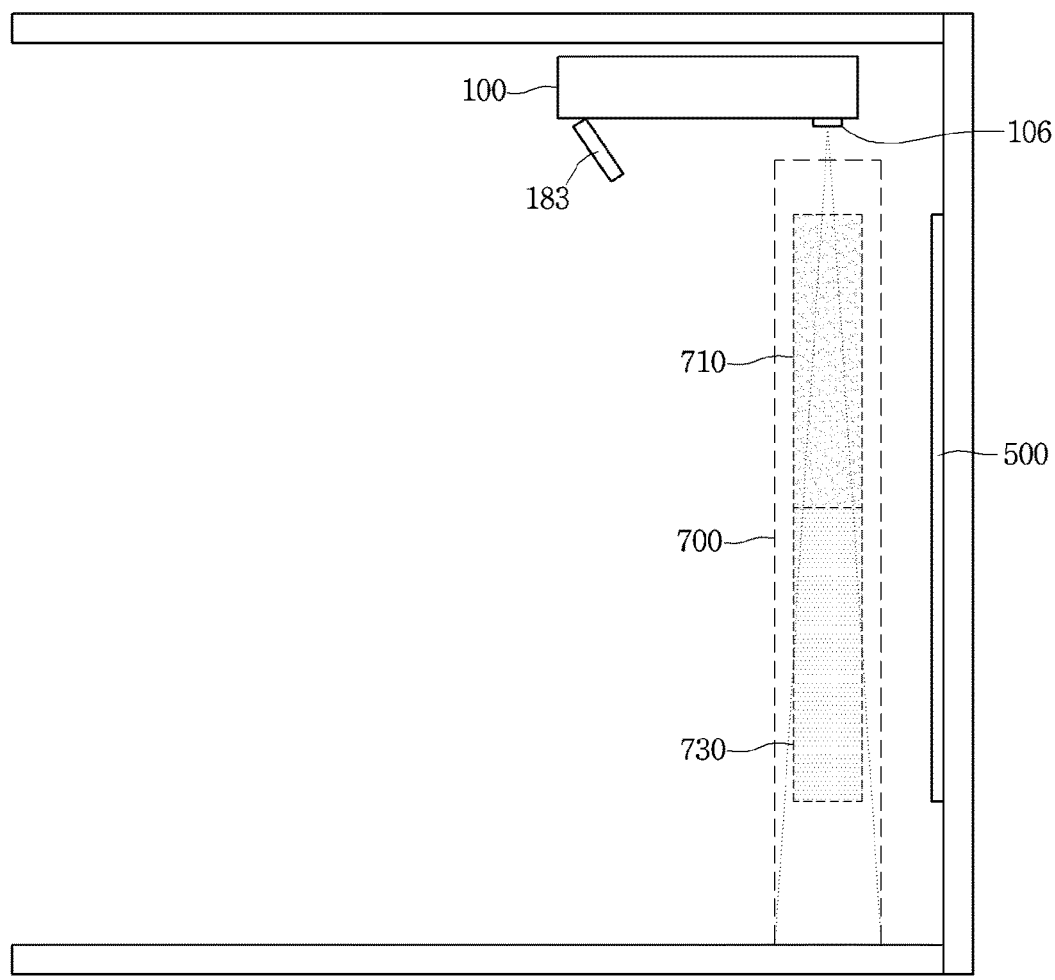
FIG. 26 is a view illustrating distance sensing to a sensing area according to an embodiment of the present invention.

FIG. 26 is a view illustrating distance sensing to a sensing area according to an embodiment of the present invention.

Referring to FIG. 26, the image projection apparatus 100 may project an image to one surface in the proximity of the image projection apparatus 100. Accordingly, an area to which the image is projected is referred to as an image projection area 500. The distance sensor 106 of the image projection apparatus 100 may sense the distance to a sensing area 700 corresponding to the image projection area 500 to which the image is projected. In this case, the sensing area 700 may be an area in the proximity of the image projection area 500 or may be an area close to the image projection area 500. The state that the image projection apparatus 100 senses the distance may be a state that the image is projected to the image projection area 500 or may be a state that the image is not projected on the image projection area 500. Meanwhile, the sensing area 700 may include a plurality of sensing areas which are divided into each other. For example, as illustrated in FIG. 26, the sensing area 700 may include an upper sensing area 710 and a lower sensing area 730.

The details of the sensing areas will be described in detail with reference to FIGS. 27 to 29.

One embodiment of the sensing areas will be described with reference to FIG. 8.

Figure 27:
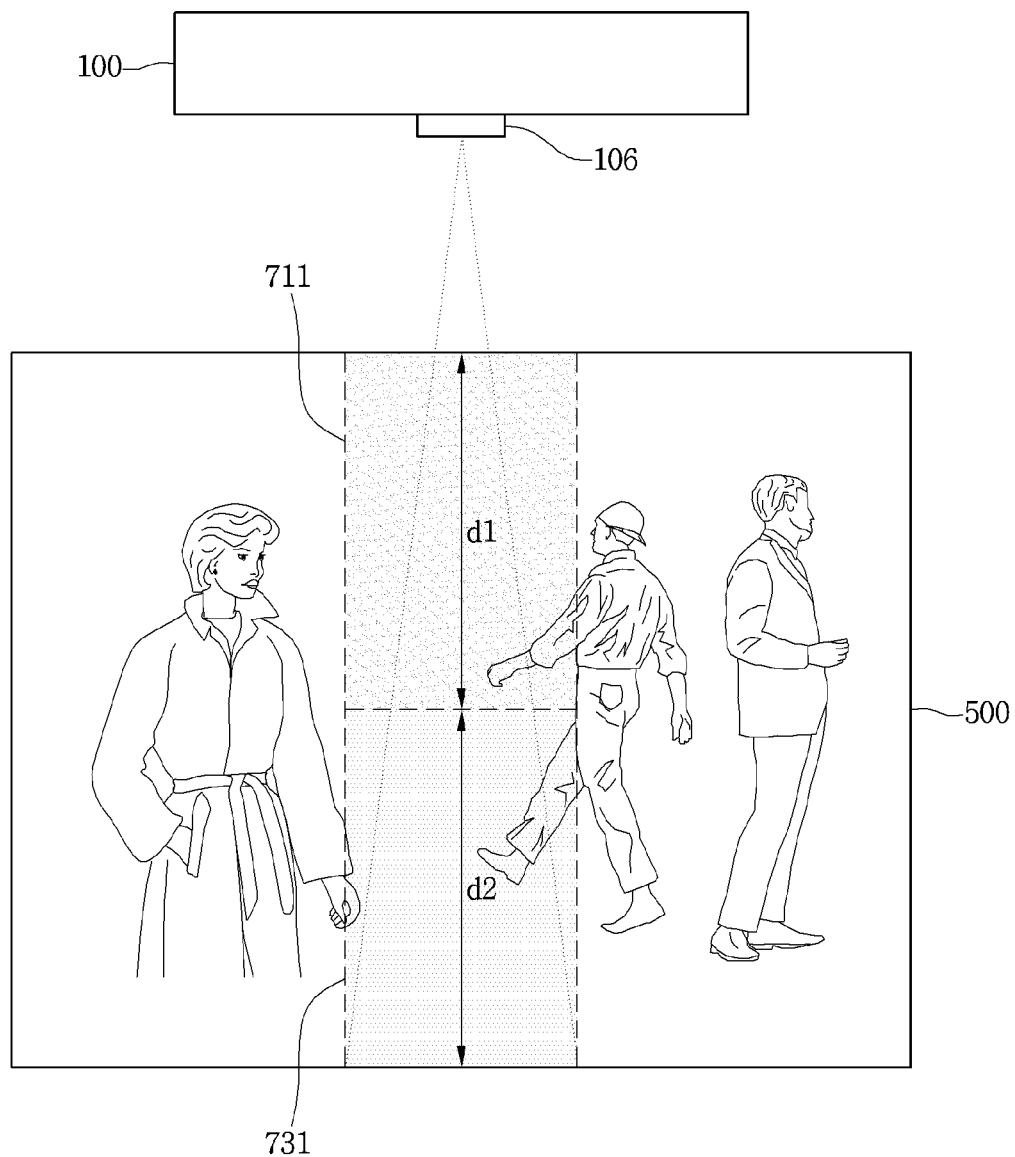
FIG. 27 is a view illustrating a plurality of sensing areas according to an embodiment of the present invention.

FIG. 27 is a view illustrating a plurality of sensing areas according to an embodiment of the present invention.

Referring to FIG. 27, the distance sensor 106 of the image projection apparatus 100 may sense distances to a first sensing area 711 and a second sensing area 731 corresponding to the image projection area 500 to which the image is projected. In this case, the first sensing area 711 may be an area at less than a first distance d1 downward from the upper end of the image projection area 500, and the second sensing area 731 may be an area at less than a second distance d2 upward from the lower end of the image projection area 500. Accordingly, the control unit 170 may recognize, based on a distance value sensed by the distance sensor 106, whether a specific object is positioned at the first sensing area 711 or the second sensing area 731.

Another embodiment of the sensing areas will be described with reference to FIG. 28.

Figure 28:
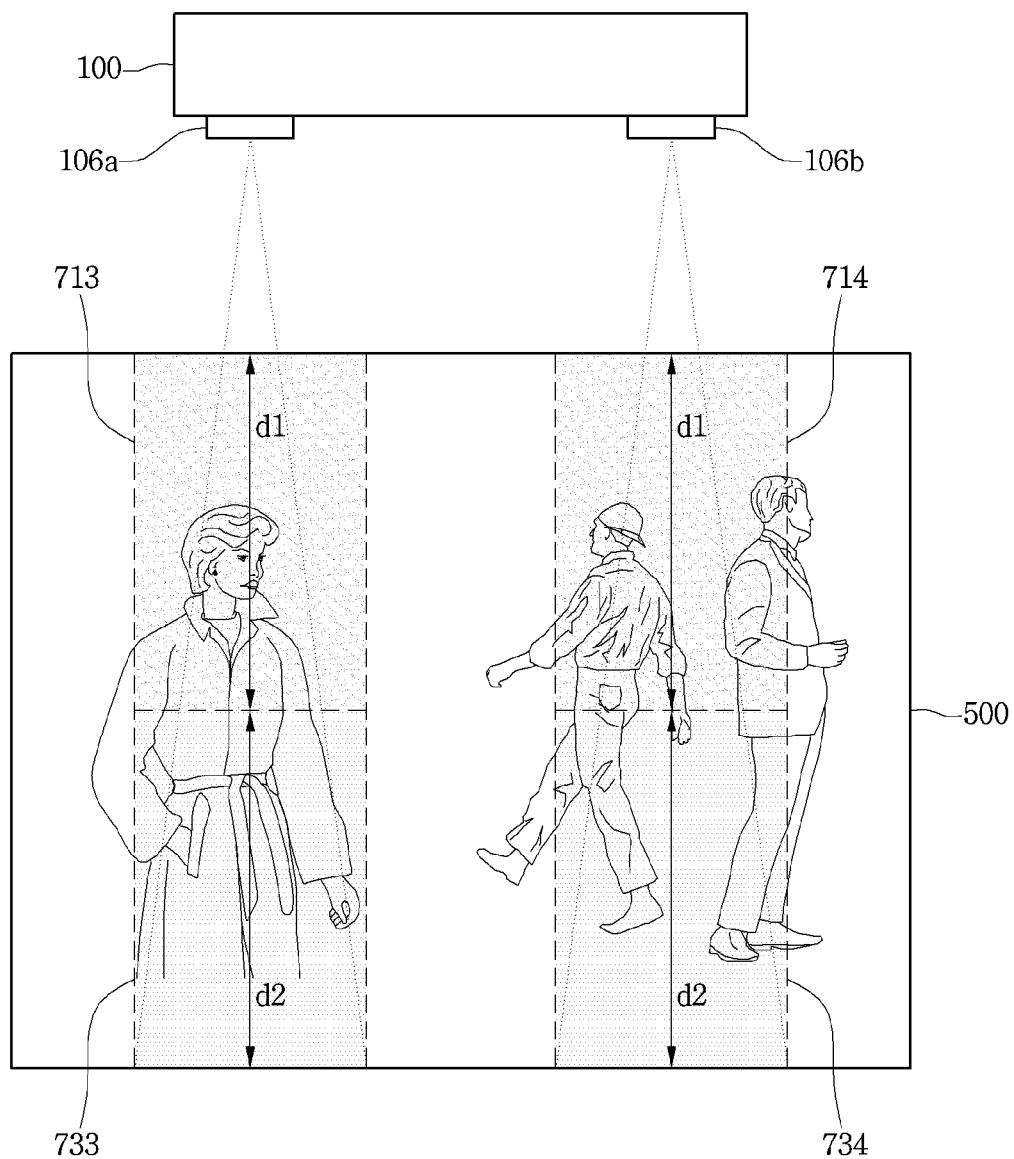
FIG. 28 is a view illustrating a plurality of sensing areas according to another embodiment of the present invention.

FIG. 28 is a view illustrating a plurality of sensing areas according to another embodiment of the present invention.

Referring to FIG. 28, the image projection apparatus 100 may include the first distance sensor 106a and the second distance sensor 106b which are a plurality of distance sensors 106. Each of the first distance sensor 106a and the second distance sensor 106b may sense the distance to a sensing area corresponding to the image projection area 500. The first distance sensor 106a may sense distances to a third sensing area 713, which is an area at less than the first distance d1 downward from the upper end of the image projection apparatus 500, and a fourth sensing area 733 which is an area at less than the second distance d2 upward from the lower end of the image projection apparatus 500, at one area in the left of the image projection apparatus 500. The second distance sensor 106b may sense distances to a fifth sensing area 714, which is an area at less than the first distance d1 downward from the upper end of the image projection apparatus 500, and a sixth sensing area 734 which is an area at less than the second distance d2 upward from the lower end of the image projection apparatus 500, at one area in the right of the image projection apparatus 500. Accordingly, the control unit 170 may recognize, based on a distance value sensed by each of the first distance sensor 106a and the second distance sensor 106b, whether a specific object is located in at least one of the third sensing area 713, the fourth sensing area 733, the fifth sensing area 714, and the sixth sensing area 733.

Another embodiment of the sensing areas will be described with reference to FIG. 29.

Figure 29:
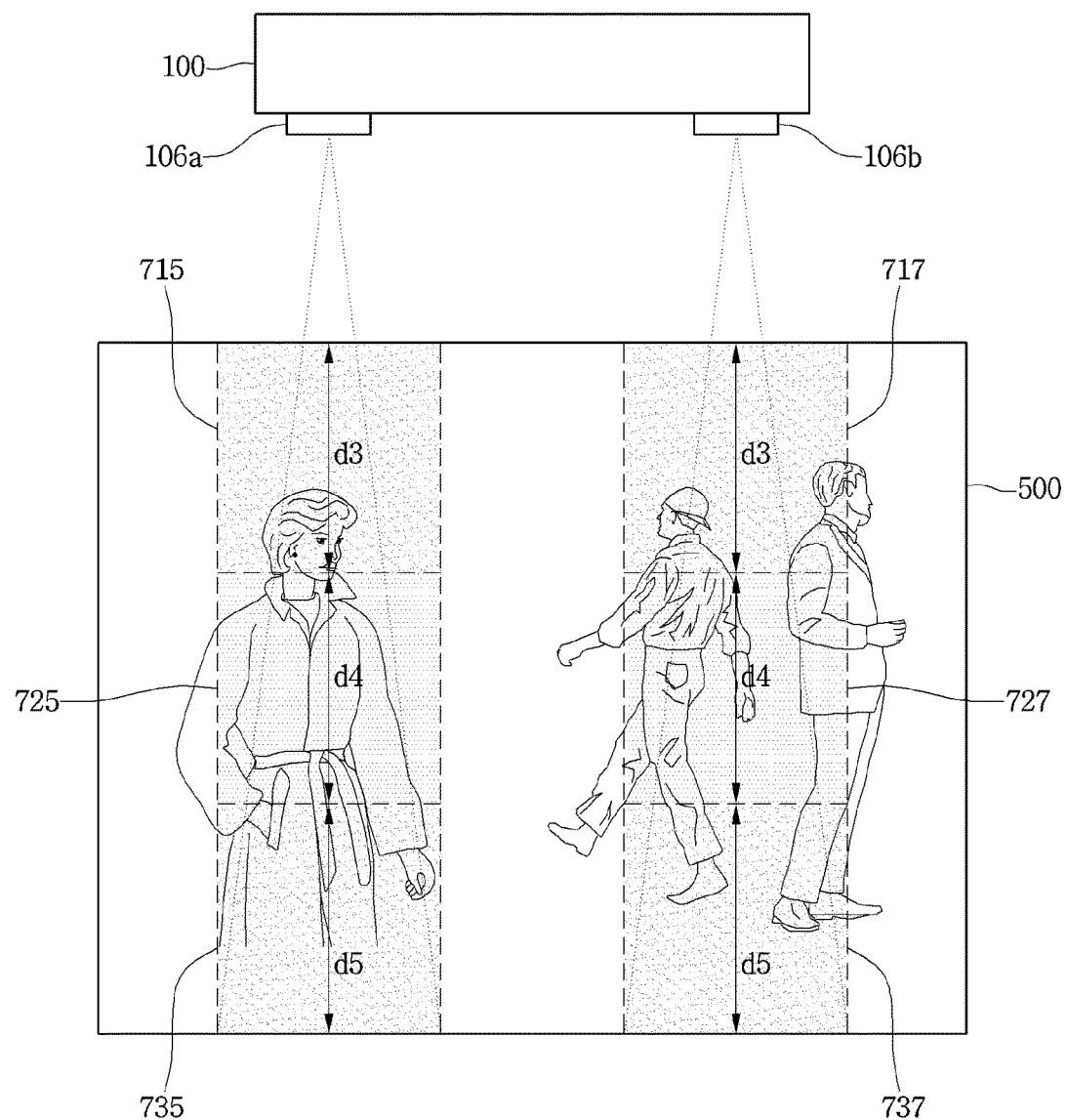
FIG. 29 is a view illustrating a plurality of sensing areas according to still another embodiment of the present invention.

FIG. 29 is a view illustrating a plurality of sensing areas according to still another embodiment of the present invention.

Referring to FIG. 29, the image projection apparatus 100 may include the first distance sensor 106a and the second distance sensor 106b which are a plurality of distance sensors 106. Each of the first distance sensor 106a and the second distance sensor 106b may sense the distance to a sensing area corresponding to the image projection area 500. The first distance sensor 106a may sense distances to a seventh sensing area 715, which is an area at less than the third distance d3 downward from the upper end of the image projection apparatus 500, and an eighth sensing area 725 which is an area at less than the fourth distance d5 toward of the lower end of the image projection apparatus 500 from the lower end of the seventh sensing area 715, and a ninth sensing area 735 at less than the fifth distance d5 upward from the lower end of the image projection apparatus 500, at one area in the left of the image projection apparatus 500. The second distance sensor 106b may sense distances to a tenth sensing area 717, which is an area at less than the third distance d3 downward from the upper end of the image projection apparatus 500, and an eleventh sensing area 727 which is an area at less than the fourth distance d5 toward of the lower end of the image projection apparatus 500 from the lower end of the tenth sensing area 717, and a twelfth sensing area 737 at less than the fifth distance d5 upward from the lower end of the image projection apparatus 500, at one area in the right of the image projection apparatus 500. Accordingly, the control unit 170 may recognize, based on a distance value sensed by each of the first distance sensor 106a and the second distance sensor 106b, whether a specific object is located in at least one of the seventh sensing area 715, the eight sensing area 725, the ninth sensing area 735, the tenth sensing area 717, the eleventh sensing area 727, and the twelfth sensing area 737.

The above description of the distance sensor and the sensing area is provided for the illustrative purpose, but the present invention is not limited thereto. Accordingly, the arrangement of the distance sensors and the number of the distance sensors may be varied depending on the selection of the user or the designer. In addition, the sensing areas may be set with various distances and in various directions depending on the selection of the user or the designer.

Description will be made again with reference to FIG. 25.

Referring to FIG. 25, the control unit 170 of the image projection apparatus 100 recognizes, based on the sensed distance, a trigger operation for displaying at least one menu (S230).

The control unit 170 may acquire the sensed distance to the sensing area 700 by at least one distance sensor 106 and may recognize, based on the acquired distance, a trigger operation for displaying at least one menu.

According to an embodiment, the trigger operation for displaying a menu may be a user input of swiping in one direction from the sensing area 700 corresponding to the image projection apparatus 500.

The details thereof will be described with reference to FIGS. 30 to 31

Figure 30:
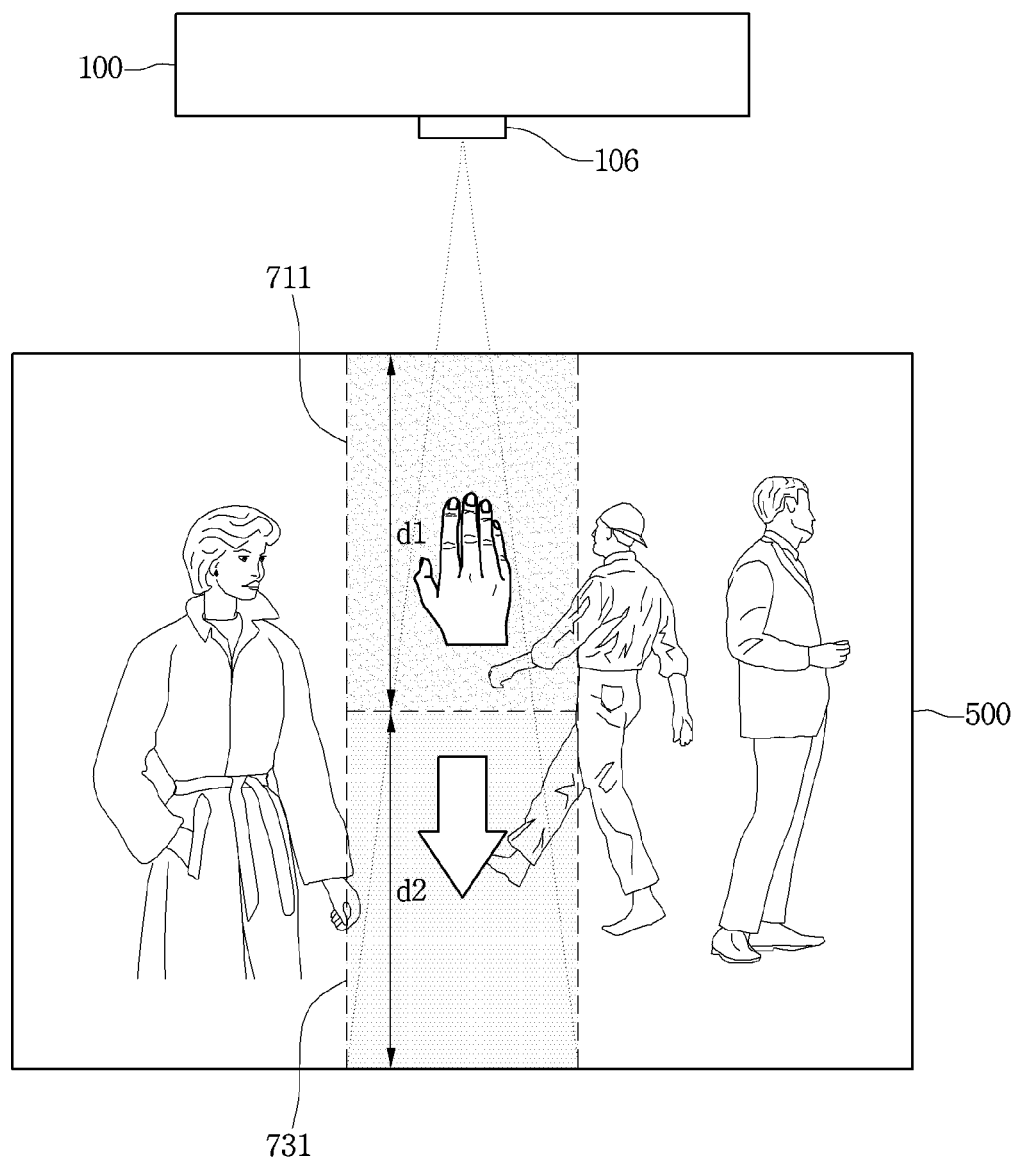
FIG. 30 is a view illustrating a trigger operation in an up-down direction according to an embodiment of the present invention.

FIG. 30 is a view illustrating a trigger operation in an up-down direction according to an embodiment of the present invention.

Referring to FIG. 30, the distance sensor 106 of the image projection apparatus 100 may sense distances to a first sensing area 711 and a second sensing area 731 corresponding to the image projection area 500 to which the image is projected. In this case, the first sensing area 711 may be an area at less than the first distance d1 downward from the upper end of the image projection area 500, and the second sensing area 731 may be an area at less than the second distance d2 upward from the lower end of the image projection area 500. The control unit 170 may recognize, based on the distance sensed by the distance sensor 106, a swipe operation in which the hand of a user moves from the first area 711 to the second area 731. In addition, the control unit 170 may recognize the recognized swipe operation as the trigger operation for displaying the menu.

Meanwhile, the control unit 170 of the image projection apparatus 100 may recognize an operation of swiping in an up-down direction within the same sensing area as the trigger operation.

In addition, the trigger operation for displaying the menu may be an operation of swiping upward, or an operation of swiping downward.

Figure 31:
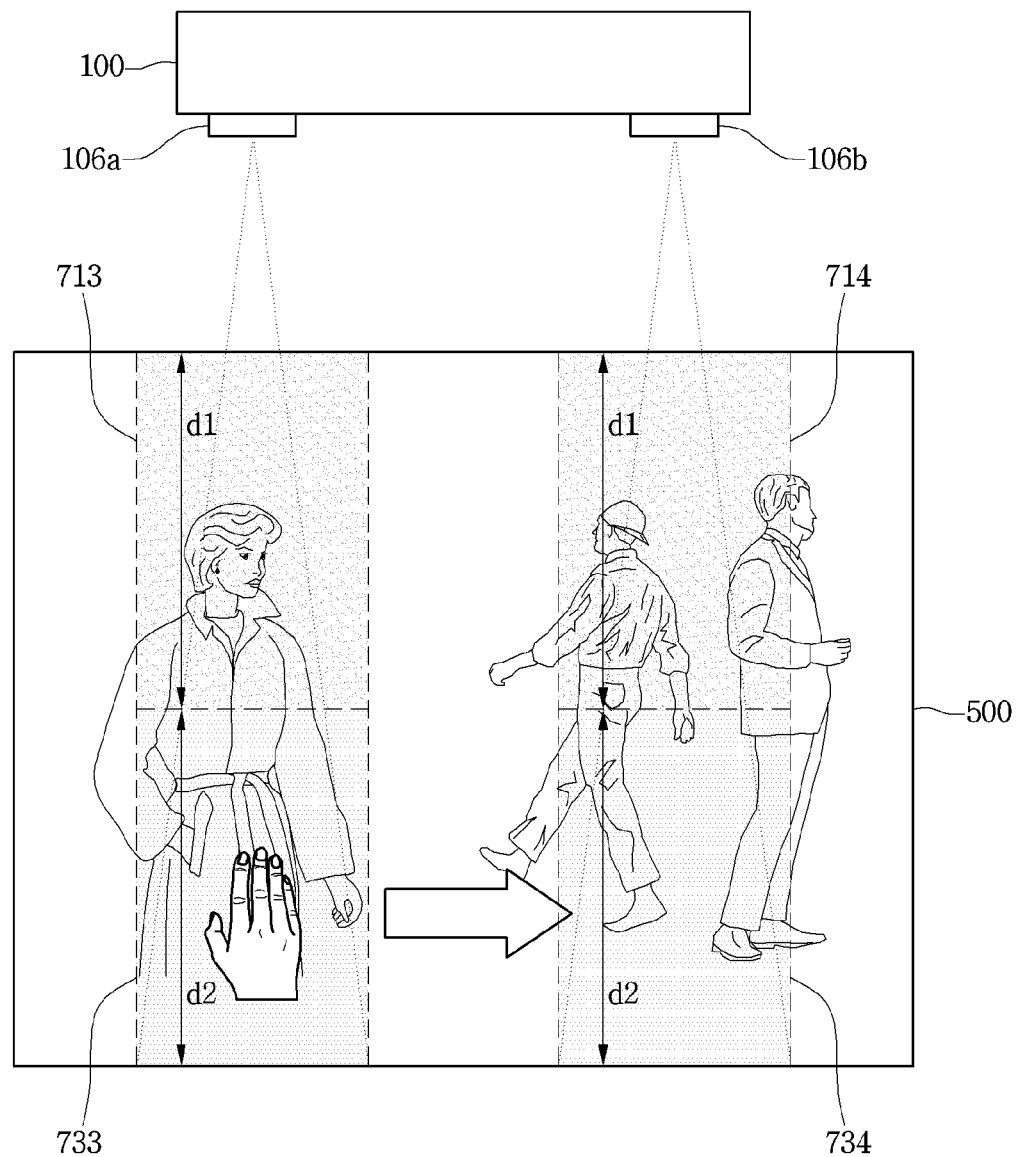
FIG. 31 is a view illustrating a trigger operation in an up-down direction according to an embodiment of the present invention.

FIG. 31 is a view illustrating a trigger operation in a left-right direction according to an embodiment of the present invention.

Referring to FIG. 31, the image projection apparatus 100 may include the first distance sensor 106a and the second distance sensor 106b which are a plurality of distance sensors 106. Each of the first distance sensor 106a and the second distance sensor 106b may sense the distance to a sensing area corresponding to the image projection area 500. The first distance sensor 106a may sense distances to a third sensing area 713, which is an area at less than the first distance d1 downward from the upper end of the image projection apparatus 500, and a fourth sensing area 733 which is an area at less than the second distance d2 upward from the lower end of the image projection apparatus 500, at one area in the left of the image projection apparatus 500. The second distance sensor 106b may sense distances to a fifth sensing area 714, which is an area at less than the first distance d1 downward from the upper end of the image projection apparatus 500, and a sixth sensing area 734 which is an area at less than the second distance d2 upward from the lower end of the image projection apparatus 500, at one area in the right of the image projection apparatus 500. Accordingly, the control unit 170 may recognize, based on a distance sensed by at least one of the first distance sensor 106a and the second distance sensor 106b, a swipe operation in which the hand of a user moves from a sensing area corresponding to the first distance sensor 106a to a sensing area corresponding to the second distance sensor 106b. For example, the control unit 170 may recognize, based on distances sensed by the first distance sensor 106a and the second distance sensor 106b, a swipe operation in which the hand of a user moves from a sixth sensing area 733 to an eighth sensing area 734. In addition, the control unit 170 may recognize the recognized swipe operation as the trigger operation for displaying the menu.

In addition, the trigger operation for displaying the menu may be an operation of swiping rightward, or an operation of swiping leftward.

Meanwhile, the control unit 170 of the image projection apparatus 100 may recognize a tap operation, in which the hand of a user moves in the up-down direction with respect to the image projection area 500, as the trigger operation for displaying the menu.

For example, the control unit 170 may recognize the tap operation, in which the hand of the user moves in the up-down direction with respect to the image projection apparatus 500, based on the variation of the distance value sensed by the distance sensor 106, which is made by the tap operation in which the hand of the user moves in the up-down direction with respect to the image projection apparatus 500. In addition, the control unit 170 may recognize the recognized tap operation as the trigger operation for displaying the menu.

The above description of the trigger operation is provided for the illustrative purpose, but the present invention is not limited thereto. Therefore, various operations may be recognized as the trigger operation for displaying the menu, depending on the selection of the user or the designer.

Description will be made again with reference to FIG. 25.

Referring to FIG. 25, the control unit 170 of the image projection apparatus 100 displays a menu for at least one operation on the image projection area 500 (S250). The control unit 170 senses the distance for a user input corresponding to the displayed menu (S270) and performs the operation corresponding to the sensed distance (S290).

The control unit 170 may control the image projection unit 180 to project the image to the image projection area 500. In addition, the control unit 170 may control, based on the recognized trigger operation, the image projection unit 180 to display a menu related to at least one operation of the image projection apparatus 100 on the image projection area 500. Accordingly, the image projection unit 180 may display the menu related to at least one operation on an image projected on the image projection area 500. The distance sensor 106 may sense the distance to an object according to a user input corresponding to at least one menu displayed on the image projection area 500. In this case, the object may be the hand of the user. In addition, the control unit 170 may perform the operation corresponding to the displayed menu and the sensed distance. For example, the control unit may perform an operation corresponding to the selected menu, corresponding to one menu in which the sensed distance is displayed.

The details thereof will be described with reference to FIGS. 32 to 34

First, the case that one distance sensor 106 is provided will be described with reference to FIGS. 32 to 34.

Figure 32:
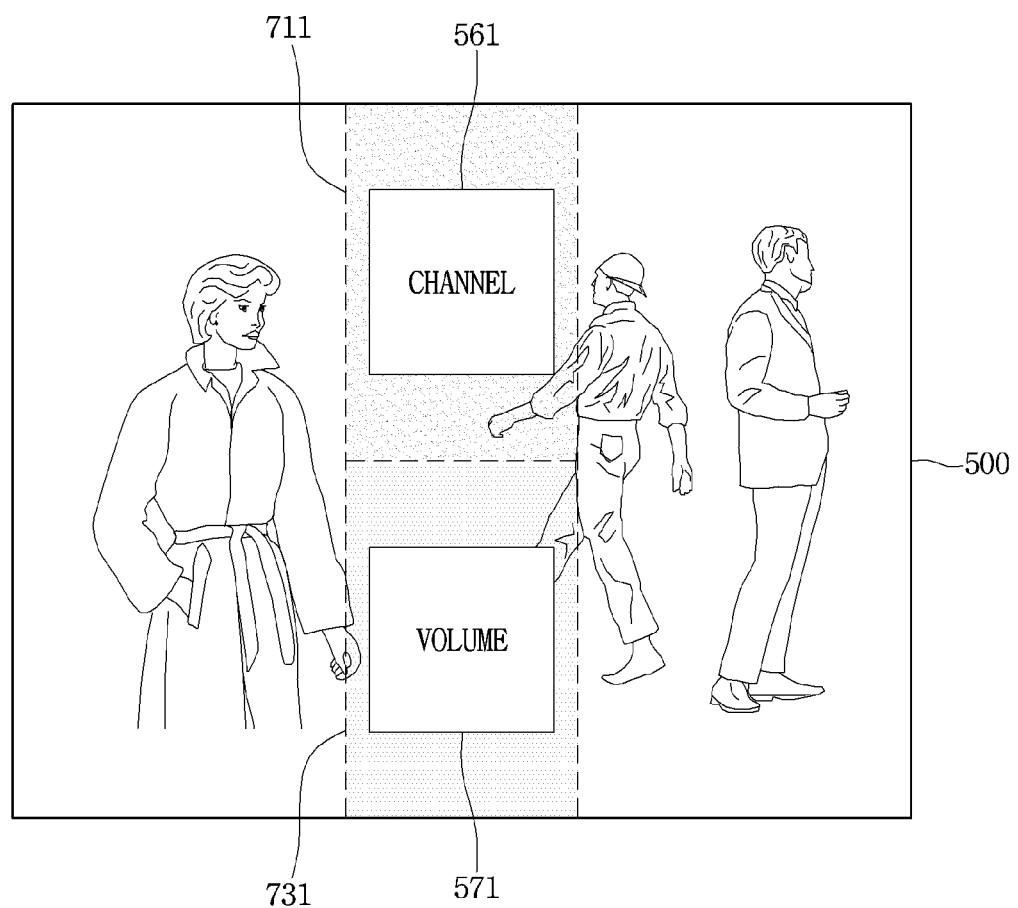
FIG. 32 is a view illustrating the displaying of an operation selection menu according to an embodiment of the present invention.

FIG. 32 is a view illustrating the displaying of an operation selection menu according to an embodiment of the present invention.

Figure 33:
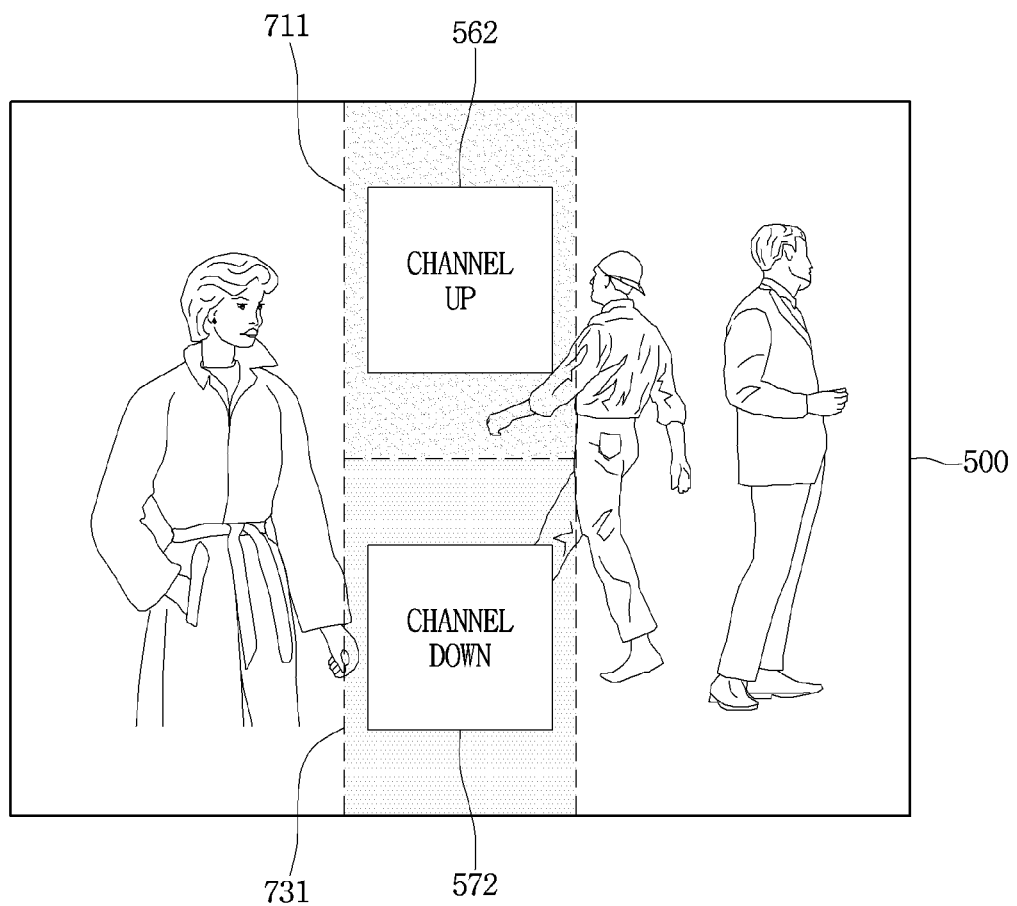
FIG. 33 is a view illustrating the displaying of a channel menu according to an embodiment of the present invention.

FIG. 33 is a view illustrating the displaying of a channel menu according to an embodiment of the present invention.

Figure 34:
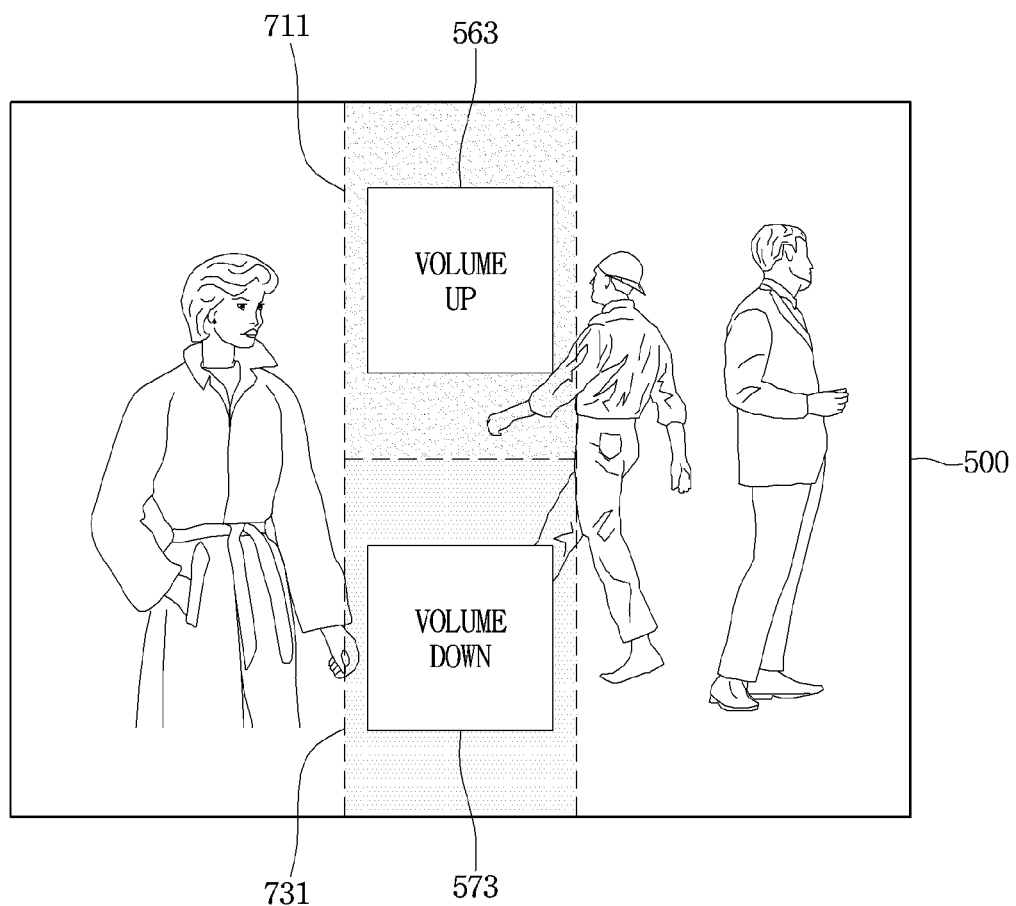
FIG. 34 is a view illustrating the displaying of a volume menu according to an embodiment of the present invention.

FIG. 34 is a view illustrating the displaying of a volume menu according to an embodiment of the present invention.

Referring to FIG. 32, the control unit 170 may display a channel menu 561 and a volume menu 571 on one area of the image projection area 500, corresponding to the recognized trigger operation. In this case, the channel menu 561 may be a menu for displaying a channel change menu, and the volume menu 571 may be a menu for displaying a volume change menu. In addition, the control unit 170 may display the channel menu 561 on a position corresponding to the first sensing area 711 of the image projection area 500 and may display the volume menu 571 on a position corresponding to the second sensing area 731 of the image projection area 500. Accordingly, the control unit 170 may recognize that the user selects the channel menu 561 if recognizing a user input to the first sensing area 711, based on the distance sensed by the distance sensor 106. Accordingly, the control unit 170 may recognize that the user selects the volume menu 571 if recognizing a user input to the second sensing area 731, based on the distance sensed by the distance sensor 106.

Meanwhile, the control unit 170 may display the channel change menu on the image projection area 500 in the case that the user selects the channel menu 561. Referring to FIG. 33, the control unit 170 may display a channel up menu 562 and a channel down menu 572 on one area of the image projection area 500. The channel up menu 562 and the channel down menu 572 may be menus for changing a channel displayed on the image projection area 500. In addition, the control unit 170 may display the channel up menu 562 on a position corresponding to the first sensing area 711 of the image projection area 500 and may display the channel down menu 563 on a position corresponding to the second sensing area 731 of the image projection area 500. Accordingly, the control unit 170 may recognize that the user selects the channel up menu 562 if recognizing a user input to the first sensing area 711, based on the distance sensed by the distance sensor 106. Therefore, the control unit 170 may change the channel displayed on the image projection area 500 to a next channel. Accordingly, the control unit 170 may recognize that the user selects the channel down menu 572 if recognizing a user input to the second sensing area 731, based on the distance sensed by the distance sensor 106. Therefore, the control unit 170 may change the channel displayed on the image projection area 500 to a previous channel.

Meanwhile, the control unit 170 may display the volume change menu on the image projection area 500 in the case that the user selects the volume menu 571. Referring to FIG. 34, the control unit 170 may display a volume up menu 563 and a volume down menu 573 on one area of the image projection area 500. In this case, the volume up menu 563 may be a menu for increasing the volume of audio output from the audio output unit 185, and the volume down menu 573 may be a menu for decreasing the volume of the audio output from the audio output unit 185. In addition, the control unit 170 may display the volume up menu 563 on a position corresponding to the first sensing area 711 of the image projection area 500 and may display the volume down menu 573 on a position corresponding to the second sensing area 731 of the image projection area 500. Accordingly, the control unit 170 may recognize that the user selects the volume up menu 563 if recognizing a user input to the first sensing area 711, based on the distance sensed by the distance sensor 106. Therefore, the control unit 170 may increase the volume of the audio output from the audio output unit 185. Accordingly, the control unit 170 may recognize that the user selects the volume down menu 573 if recognizing a user input to the second sensing area 731, based on the distance sensed by the distance sensor 106. Therefore, the control unit 170 may decrease the volume of the audio output from the audio output unit 185.

The case that a plurality of distance sensors 106a and 106b are provided will be described with reference FIG. 35.

Figure 35:
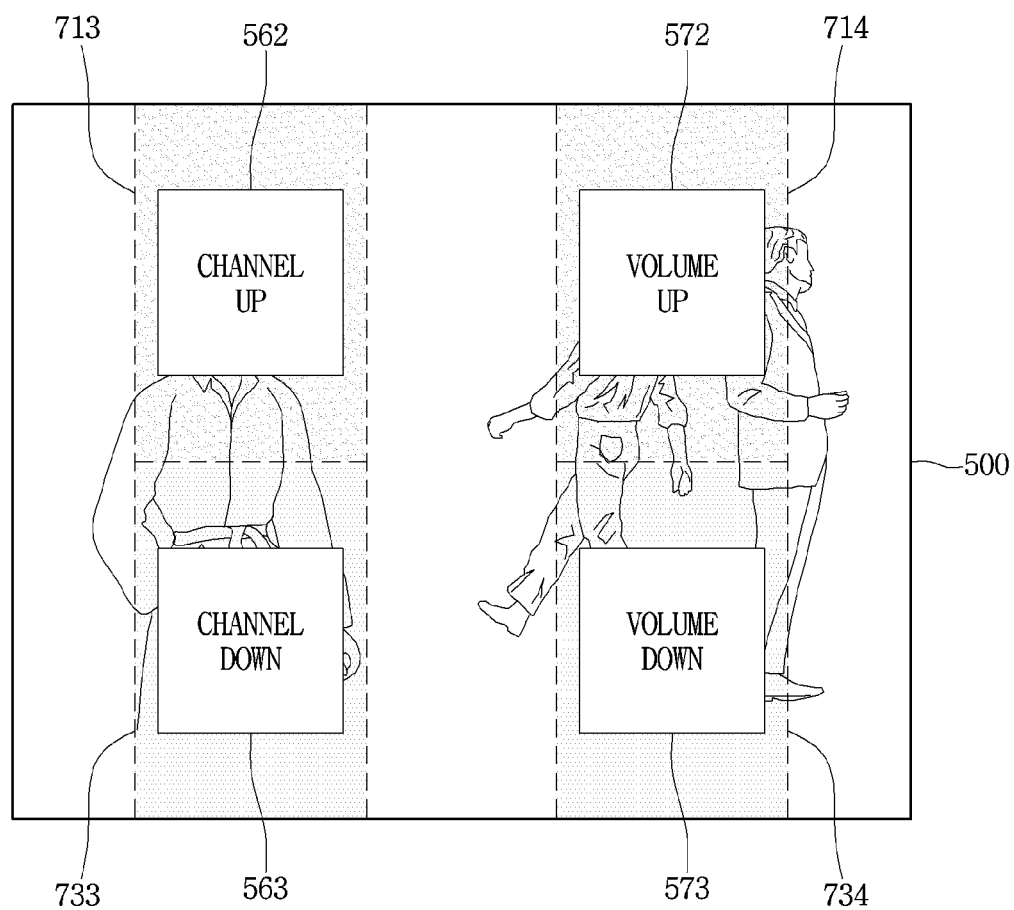
FIG. 35 is a view illustrating the displaying of an operation selection menu according to another embodiment of the present invention.

FIG. 35 is a view illustrating the displaying of an operation selection menu according to another embodiment of the present invention.

Referring to FIG. 35, the control unit 170 may display the channel up menu 562 and the channel down menu 563 on one area of the image projection area 500 corresponding to the first distance sensor 106a, in response to the recognized trigger operation. In addition, the control unit 170 may display the channel up menu 562 on a position corresponding to the third sensing area 713 of the image projection area 500 and may display the channel down menu 563 on a position corresponding to the fourth sensing area 733 of the image projection area 500. Accordingly, the control unit 170 may recognize that the user selects the channel menu 562 if recognizing a user input to the third sensing area 713, based on the distance sensed by the distance sensor 106. Therefore, the control unit 170 may change the channel displayed on the image projection area 500 to a next channel. Accordingly, the control unit 170 may recognize that the user selects the channel down menu 563 if recognizing a user input to the fourth sensing area 733, based on the distance sensed by the distance sensor 106. Therefore, the control unit 170 may change the channel displayed on the image projection area 500 to a previous channel Referring to FIG. 35, the control unit 180 may display the volume up menu 572 and the volume down menu 573 on one area of the image projection area 500 corresponding to the second distance sensor 106b, in response to the recognized trigger operation. In addition, the control unit 170 may display the volume up menu 572 on a position corresponding to the fifth sensing area 714 of the image projection area 500 and may display the volume down menu 573 on a position corresponding to the sixth sensing area 734 of the image projection area 500. Accordingly, the control unit 170 may recognize that the user selects the volume up menu 572 if recognizing a user input to the fifth sensing area 714, based on the distance sensed by the distance sensor 106. Therefore, the control unit 170 may increase the volume of the audio output from the audio output unit 185. Accordingly, the control unit 170 may recognize that the user selects the volume down menu 573 if recognizing a user input to the second sensing area 734, based on the distance sensed by the distance sensor 106. Therefore, the control unit 170 may decrease the volume of the audio output from the audio output unit 185.

Another embodiment of the case that a plurality of distance sensors 106a and 106b will be described with reference to FIG. 36.

Figure 36:
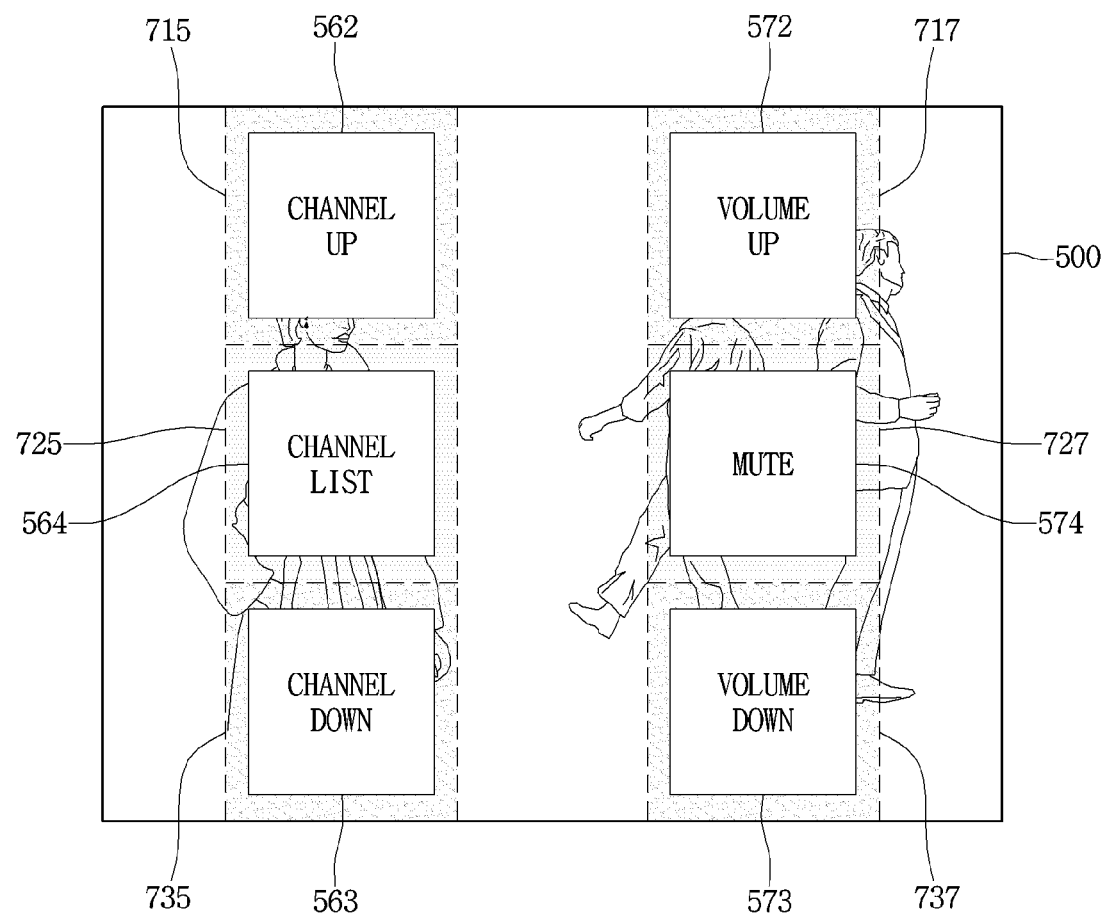
FIG. 36 is a view illustrating the displaying of an operation selection menu according to another embodiment of the present invention.

FIG. 36 is a view illustrating the displaying of an operation selection menu according to another embodiment of the present invention.

Referring to FIG. 36, the control unit 170 may display the channel up menu 562, a channel list menu 564, and the channel down menu 563 on one area of the image projection area 500 corresponding to the first distance sensor 106a, in response to the recognized trigger operation. In this case, the channel list menu 564 may be a menu for displaying at least one channel. In addition, the control unit 170 may display the channel up menu 562 on a position corresponding to the seventh sensing area 715 of the image projection area 500, may display the channel list menu 564 on a position corresponding to the eighth sensing area 725, and may display the channel down menu 563 on a position corresponding to the ninth sensing area 735. Accordingly, the control unit 170 may recognize that the user selects the channel up menu 562 if recognizing a user input to the seventh sensing area 715, based on the distance sensed by the first distance sensor 106a. Therefore, the control unit 170 may change the channel displayed on the image projection area 500 to a next channel. Accordingly, the control unit 170 may recognize that the user selects the channel list menu 564 if recognizing a user input to the eighth sensing area 725, based on the distance sensed by the first distance sensor 106a. Therefore, the control unit 170 may display a channel list on the image projection area through the image projection unit 180. Accordingly, the control unit 170 may recognize that the user selects the channel down menu 563 if recognizing a user input to the ninth sensing area 735, based on the distance sensed by the first distance sensor 106a. Therefore, the control unit 170 may change the channel displayed on the image projection area 500 to a previous channel.

The control unit 180 may display the volume up menu 572, a mute menu 574, and the volume down menu 573 on one area of the image projection area 500 corresponding to the second distance sensor 106b, in response to the recognized trigger operation. In this case, the mute menu 574 may be a menu for stopping the output of audio from the audio output unit 185. In addition, the control unit 170 may display the volume up menu 572 on a position corresponding to the tenth sensing area 717 of the image projection area 500, may display the mute menu 574 on a position corresponding to the eleventh sensing area 727 of the image projection area 500, and may display the volume down menu 573 on a position corresponding to the twelfth sensing area 737 of the image projection area 500. Accordingly, the control unit 170 may recognize, based on the distance sensed by the second distance sensor 106b, that the user selects the volume up menu 572 if recognizing a user input to the tenth sensing area 717. Therefore, the control unit 170 may increase the volume of the audio output from the audio output unit 185. Accordingly, the control unit 170 may recognize, based on the distance sensed by the second distance sensor 106b, that the user selects the mute menu 574 if recognizing a user input to the eleventh sensing area 727. Accordingly, the control unit 170 may stop the output of the audio. Accordingly, the control unit 170 may recognize that the user selects the mute menu 573 if recognizing a user input to the eleventh sensing area 737, based on the distance sensed by the second distance sensor 106b. Therefore, the control unit 170 may decrease the volume of the audio output from the audio output unit 185.

Meanwhile, the above description of the operation performed corresponding to the sensed distance is provided for the illustrative purpose, but the present invention is not limited thereto. Accordingly, various menus may be displayed depending on the selection of the user or the designer, and various operations corresponding to various menus may be performed by the image projection apparatus 100.

According to an embodiment of the present invention, the above method may be implemented in the form of a computer-readable code in a media having a program. For example, the computer-readable recording medium may be a read-only memory (ROM), a random-access memory (RAM), a compact disk read-only memory (CD-ROM), a magnetic tape, a floppy disk, an optical data storage device, and the like. Also, the recording medium may be implemented in the form of carrier waves, (e.g., transmission over the Internet).

Accordingly, the above-described image projection apparatus should not be limitedly interpreted, but be considered only for the illustrative purpose It is intended that the present disclosure covers all such modifications provided they come within the scope of the appended claims and their equivalents.

The invention claimed is:

1. An operating method of an image projection apparatus, the operating method comprising:
    sensing at least one distance to an image projection area to which an image is projected, wherein the image projection area comprises a moveable image projection surface and the at least one distance comprises a first distance to the moveable image projection surface;
    determining, based on the sensed at least one distance, an image projection state including a state of the image projection area and a space between the image projection apparatus and the image projection area; and
    projecting, based on the determined image projection state, the image to the image projection area;
    detecting a change in the image projection state; and
    adjusting the projected image if a distance to a new image projection surface is greater than the first distance.

2. The operating method of claim 1, wherein the sensing of the at least one distance to the image projection area comprises sensing distances to a plurality of areas included in the image projection area;
    wherein the determining of the image projection state comprises recognizing a user input to an image screen projected to the image projection area, based on variations of the sensed distances to the plurality of areas; and
    wherein the projecting of the image to the image projection area comprises performing an operation corresponding to the recognized user input.

3. The operating method of claim 2, wherein the recognizing of the user input to the image screen comprises recognizing the user input to an area in which the variation of the sensed distance is equal to or more than a reference value, among the plurality of areas; and
    wherein the performing of the operation corresponding to the recognized user input comprises performing an operation corresponding to the area in which the variation is equal to or more than the reference value.

4. The operating method of claim 1,
    wherein adjusting the projected image comprises adjusting brightness of the projected image corresponding to the detected change in the image projection state.

5. The operating method of claim 1,
    wherein adjusting the projected image comprises projecting the projected image to another area instead of the image projection area corresponding to the detected change in the image projection state.

6. The operating method of claim 1, wherein the determining of the image projection state comprises recognizing, based on the sensed at least one distance, an obstacle in the space between the image projection apparatus and the image projection area; and
    wherein adjusting the projected image comprises changing at least one of a projection direction or a size of the projected image corresponding to the recognized obstacle.

7. A image projection apparatus comprising:
    an image projection unit to project an image;
    a sensing unit configured to sense least one distance to an image projection area to which an image is projected, wherein the image projection area comprises a moveable image projection surface and the at least one distance comprises a first distance to the moveable image projection surface; and a control unit configured to:

determine, based on the sensed at least one distance, an image projection state including a state of the image projection area and a space between the image projection apparatus and the image projection area;

control the image projection unit to project the image to the image projection area based on the determined image projection state;

detect a change in the image projection state; and adjust the projected image if a distance to a new image projection surface is greater than the first distance.

8. The image projection apparatus of claim 7, wherein the sensing unit senses distances to a plurality of areas included in the image projection area, and wherein the control unit recognizes a user input to an image screen projected to the image projection area, based on variations of the sensed distances to the plurality of areas, and performs an operation the recognized user input.

9. The image projection apparatus of claim 8, wherein the control unit:

recognizes the user input to an area in which the variation of the sensed distance is equal to or more than a reference value, among the plurality of areas; and performs an operation corresponding to the area in which the variation is equal to or more than the reference value.

10. The image projection apparatus of claim 7, wherein the control unit:

adjusts the projected image by adjusting brightness of the projected image corresponding to the detected change in the image projection state.

11. The image projection apparatus of claim 7, wherein the control unit:

adjusts the projected image by projecting the projected image to another area instead of the image projection area corresponding to the detected change in the image projection state.

12. The image projection apparatus of claim 7, wherein the control unit:

recognizes, based on the sensed at least one distance, an obstacle in the space between the image projection apparatus and the image projection area; and adjusts the projected image by changing at least one of a projection direction or a size of the projected image corresponding to the recognized obstacle.

* * * * *